United States Patent
Christian

(12) 
(10) Patent No.: US 10,516,689 B2
(45) Date of Patent: Dec. 24, 2019

(54) DISTRIBUTED DATA SURVEILLANCE IN A COMMUNITY CAPTURE ENVIRONMENT

(71) Applicant: Flying Cloud Technologies, Inc., Polson, MT (US)

(72) Inventor: Brian P. Christian, Sioux Falls, SD (US)

(73) Assignee: Flying Cloud Technologies, Inc., Polson, MT (US)

(*) Notice: Subject to any disclaimer, the term of this patent is extended or adjusted under 35 U.S.C. 154(b) by 0 days.

(21) Appl. No.: 16/219,931

(22) Filed: Dec. 13, 2018

(65) Prior Publication Data

US 2019/0132346 A1    May 2, 2019

Related U.S. Application Data

(63) Continuation-in-part of application No. 16/058,145, filed on Aug. 8, 2018, and a continuation-in-part of
(Continued)

(51) Int. Cl.
*G06F 15/173* (2006.01)
*H04L 29/06* (2006.01)
(Continued)

(52) U.S. Cl.
CPC ......... *H04L 63/1425* (2013.01); *G06N 99/00* (2013.01); *H04L 63/0245* (2013.01); *G06N 20/00* (2019.01); *H04L 63/1416* (2013.01)

(58) Field of Classification Search
CPC . H04L 63/1425; H04L 63/0245; G06N 20/00; G06N 99/00
(Continued)

(56) References Cited

U.S. PATENT DOCUMENTS 7,065,657 B1    6/2006  Moran
7,114,002 B1 *  9/2006  Okumura ............. H04L 1/1809
                                                        370/352
(Continued)

FOREIGN PATENT DOCUMENTS

WO    2014-138115 A1    9/2014

OTHER PUBLICATIONS

Atefi et al., A Hybrid Intrusion Detection System based on Different Machine Learning Algorithms, Proceedings of the 4th International Conference on Computing and Informatics, Paper No. 022, Aug. 2013, pp. 312-320.
(Continued)

*Primary Examiner* — Anthony Mejia
(74) *Attorney, Agent, or Firm* — Asif Ghias

(57) ABSTRACT

Data surveillance techniques are presented for the detection of security issues, especially of the kind where privileged data may be stolen by steganographic, data manipulation or any form of exfiltration attempts. Such attempts may be made by rogue users or admins from the inside of a network, or from outside hackers who are able to intrude into the network and impersonate themselves as legitimate users. The system and methods use a triangulation process whereby analytical results pertaining to data protocol, user-behavior and packet content are combined to establish a baseline for the data. Subsequent incoming data is then scored and compared against the baseline to detect any security anomalies. The design incorporates deployment in a distributed network so that the devices of the network participate in the detection of anomalies as a community.

21 Claims, 11 Drawing Sheets

Related U.S. Application Data application No. 16/120,704, filed on Sep. 4, 2018, which is a continuation-in-part of application No. 16/058,145, filed on Aug. 8, 2018, which is a continuation-in-part of application No. 15/938,229, filed on Mar. 28, 2018, now Pat. No. 10,178,118, application No. 16/219,931, filed on Dec. 13, 2018, which is a continuation-in-part of application No. 15/938,229, filed on Mar. 28, 2018, now Pat. No. 10,178,118, which is a continuation of application No. 14/969,347, filed on Dec. 15, 2015, now Pat. No. 9,979,740.

(51) Int. Cl.
G06N 99/00 (2019.01)
G06N 20/00 (2019.01)

(58) Field of Classification Search
USPC .......................................................... 709/224
See application file for complete search history.

(56) References Cited

U.S. PATENT DOCUMENTS

| | | |
|---|---|---|
| 7,260,846 B2 | 8/2007 | Day |
| 8,161,550 B2 | 4/2012 | Keen et al. |
| 8,213,313 B1* | 7/2012 | Doiron ................. H04L 43/028 370/235 |
| 8,276,202 B1* | 9/2012 | Dubrovsky ......... H04L 63/0245 726/22 |
| 8,448,234 B2* | 5/2013 | Mondaeev .......... H04L 63/1408 726/13 |
| 8,762,298 B1 | 6/2014 | Ranjan et al. |
| 8,782,790 B1* | 7/2014 | Smith ................. H04L 63/1416 726/24 |
| 8,793,790 B2 | 7/2014 | Khurana et al. |
| 9,060,014 B2* | 6/2015 | Crowley ................ H04L 43/12 |
| 9,083,740 B1* | 7/2015 | Ma ...................... H04L 63/1408 |
| 9,094,288 B1* | 7/2015 | Nucci .................. H04L 43/026 |
| 9,106,687 B1 | 8/2015 | Sawhney et al. |
| 9,430,646 B1* | 8/2016 | Mushtaq ............. H04L 63/1425 |
| 2005/0210533 A1 | 9/2005 | Copeland et al. |
| 2007/0220588 A1* | 9/2007 | Panda .................. G06Q 20/102 726/1 |
| 2010/0153316 A1 | 6/2010 | Duffield et al. |
| 2012/0233222 A1 | 9/2012 | Roesch |
| 2014/0165201 A1 | 6/2014 | Wittenschlaeger |
| 2015/0082456 A1 | 3/2015 | Eren et al. |
| 2015/0096024 A1 | 4/2015 | Haq et al. |
| 2015/0163121 A1 | 6/2015 | Mahaffey et al. |
| 2015/0205962 A1 | 7/2015 | Swidowski et al. |
| 2016/0014154 A1* | 1/2016 | Huang ..................... H04L 63/20 726/1 |
| 2016/0294704 A1* | 10/2016 | Fan ..................... H04L 41/0893 |
| 2016/0295422 A1* | 10/2016 | Fan ......................... H04L 47/20 |
| 2016/0301707 A1* | 10/2016 | Cheng ................ H04L 63/1425 |
| 2016/0373409 A1* | 12/2016 | Zhu ..................... H04L 61/1511 |
| 2017/0099196 A1* | 4/2017 | Barsheshet ......... H04L 12/6418 |
| 2017/0171234 A1* | 6/2017 | Christian ............ H04L 63/1425 |
| 2017/0302665 A1 | 10/2017 | Zou et al. |

OTHER PUBLICATIONS

Bhaskar et al., A Hybrid Model for Network Security Systems Integrating Intrusion Detection System with Survivability, International Journal of Network Security, vol. 7, No. 2, Sep. 2008, pp. 249-260.

C-DAC Bangalore Electronics City, Analysis of Network Packets, presentation, pp. 1-39, CDAC, Bangalore, India.

Chan et al., Machine Learning for Computer Security, Journal of Machine Learning Research 7, 2006, pp. 2669-2672.

Demertzis et al., A Hybrid Network Anomaly and Intrusion Detection Approach Based on Evolving Spiking Neural Network Classification, CCIS 441, 2014, pp. 11-23, DOI: 10.1007/978-3-319-11710-2_2.

Devi K. J et al, Hybrid Intrusion Detection with Weighted Signature Generation, International Journal of Computer Applications in Engineering Sciences vol. 1, Issue IV, Dec. 2011, pp. 450-453, ISSN: 2231-4946.

Extrahop, Universal Payload Analysis, Fact Sheet, p. 1, ExtraHop, Seattle, WA, USA.

Fireeye, AX Series Forensic Analysis Platforms that Provide a Full 360-degree View of a Cyber Attack, Fact Sheet, 2014, pp. 1-3, FireEye Inc., Milpitas, CA, USA.

Garcia-Teodoro et al, Network-based Hybrid Intrusion Detection and Honeysystems as Active Reaction Schemes, IJCSNS International Journal of Computer Science and Network Security, vol. 7 No. 10, Oct. 2007, pp. 62-70.

Hashim, The Integration of SNORT with K-Means Clustering Algorithm to Detect New Attack, presentation, Fakultat fur Informatik Technische, 2011, pp. 1-14, Munich, Germany.

Hijazi, Network Traffic Characterization Using (p, n)-grams Packet Representation, Thesis for Doctor of Philosophy, Carleton University, 2014, Ontario, Canada.

Hwang et al., Hybrid Intrusion Detection with Weighted Signature Generation over Anomalous Internet Episodes, IEEE Transactions on Dependable and Secure Computing, vol. 4, No. 1, Jan.-Mar. 2007, pp. 1-15.

Intel, A Well-Connected Sandbox, Solution Brief, pp. 1-5, 2015, McAfee, Part of Intel Security, Santa Clara, CA, USA.

Jawhar et al., Design Network Intrusion Detection System using hybrid Fuzzy-neural Network, International Journal of Computer Science and Security, vol. (4): Issue (3), 2010, pp. 285-294.

Jeyanna et al., A Network Intrusion Detection System Using Clustering and Outlier Detection, International Journal of Innovative Research in Computer and Communication Engineering, vol. 3, Issue 2, Feb. 2015, pp. 975-982, ISSN Online): 2320-9801, ISSN (Print): 2320-9798.

Juvonen et al., Combining Conjunctive Rule Extraction with Diffusion Maps for Network Intrusion Detection, authors' postprint version of the article. The original print version appeared in the Eighteenth IEEE Symposium on Computers and Communications (ISCC 2013). IEEE 2013. Available online at http://ieeexplore.ieee.org/stamp/stamp.jsp?p=&arnumber=66754981&isnumber=6754912.

Kizza, Guide to Computer Network Security, Chapter 13: System Intrusion Detection and Prevention, 2009.

Kornblum, Jesse, "Identifying Almost Identical Files Using Context Triggered Piecewise Hashing", The Digital Forensic Research Conference (DFRWS), Aug. 14-16, 2006, Science Direct, Elsevier, 8 pgs.

Madbouly et al., Relevant Feature Selection Model Using Data Mining for Intrusion Detection System, International Journal of Engineering Trends and Technology (IJETT)—vol. 9 No. 10—Mar. 2014, pp. 501-512, ISSN:2231-5381.

McCaffrey, Data Clustering—Detecting Abnormal Data Using k-Means Clustering, Microsoft Developer Network (MSDN) Magazine, Feb. 2013, pp. 1-17.

Mrdovic, Network packet payload analysis for intrusion detection, University of Sarajevo, 2006, pp. 1-6, Sarajevo, Bosnia.

Munz et al., Signature Detection in Sampled Packets, publication of Wilhelm Schickard Institute for Computer Science, University of Tuebingen, 2007, pp. 1-6, Tuebingen, Germany.

Munz et al., Traffic Anomaly Detection Using K-Means Clustering, publication of Wilhelm Schickard Institute for Computer Science, University of Tuebingen, 2007, pp. 1-8, Tuebingen, Germany.

Omar et al., Machine Learning Techniques for Anomaly Detection: An Overview, International Journal of Computer Applications (0975-8887) vol. 79—No. 2, Oct. 2013, pp. 33-41.

Payload Security, VxStream Sandbox-Automated Malware Analysis System, Fact Sheet, 2015, Germany.

Perona et al, Service-independent payload analysis to improve intrusion detection in network traffic, Australian Computer Society, Inc., Seventh Australasian Data Mining Conference AusDM 2008, Glenelg, Australia.

Prathibha KS et al, Analysis of Hybrid Intrusion Detection System Based on Data Mining Techniques, International Journal of Engi-

(56) References Cited

OTHER PUBLICATIONS neering Trends and Technology (IJETT)—vol. 15 No. 9—Sep. 2014, pp. 448-452, ISSN: 2231-5381.
Rashida, Hybrid Architecture for Distributed Intrusion Detection System in Wireless Networks, International Journal of Network Security & Its Applications (IJNSA), vol. 5, No. 3, May 2013, pp. 45-54, DOI: 10.5121/ijnsa.2013.5305.
Sedjelmaci et al., Novel Hybrid Intrusion Detection system for Clustered Wireless Sensor Network, International Journal of Network Security & Its Applications (IJNSA), vol. 3, No. 4, Jul. 2011, pp. 1-14.
Seyyedi et al, High Payload and Secure Steganography method Based on Block Partitioning and Integer Wavelet Transform, International Journal of Security and Its Applications vol. 8, No. 4, 2014, pp. 183-194 http://dx.doi.org/10.14257/ijsia.2014.8.4.17.
Shanmugam et al, Hybrid Intrusion Detection Systems (HIDS) using Fuzzy Logic, Intrusion Detection Systems, Dr. Pawel Skrobanek (Ed.), ISBN: 978-953-307-167-1, InTech, Available from: http://www.intechopen.com/books/intrusion-detection-systems/hybrid-intrusion-detection-systems-hids-using-fuzzy-logic, 2011, pp. 136-154, Kuala Lumpur, Malaysia.
Shon et al, A hybrid machine learning approach to network anomaly detection, Information Sciences 177, 2007, pp. 3799-3821, doi:10.1016/j.ins.2007.03.025.
Smutz, Network Payload Analysis for Advanced Persistent Threats, presentation, Lockheed Martin GIRT, 2010, pp. 1-36.
Stiawan et al, Characterizing Network Intrusion Prevention System, International Journal of Computer Applications (0975-8887) vol. 14—No. 1, Jan. 2011, pp. 11-18.
Summers, Packet Analysis Reference Guide v3.0, CISSP-ISSAP, ISSMP, CISA, 4001 Rec, 2008, pp. 1-46.
Tesfahun et al., Effective Hybrid Intrusion Detection System: A Layered Approach, I. J. of Computer Network and Information Security, Feb. 2015, pp. 35-41, DOI: 10.5815/ijcnis.2015.03.05.
Wang et al, Network Anomaly Detection: A Survey and Comparative Analysis of Stochastic and Deterministic Methods, Boston University research publication, 2013, pp. 1-7, Boston, MA, USA.
Wang, Network Payload-based Anomaly Detection and Content-based Alert Correlation, Submitted in partial fulfillment of the requirements for the degree of Doctor of Philosophy in the Graduate School of Arts and Sciences, Columbia University, 2006.
Zanero, Analyzing TCP Traffic Patterns Using Self Organizing Maps, publication, D.E.I.—Politecnico di Milano, via Ponzio 34/5-20133, 2005, pp. 1-8, Milan, Italy.
Zhang et al, Improvments of Payload-based Intrusion Detection Models by Using Noise Against Fuzzy SVM, Journal of Networks, vol. 6, No. 2, Feb. 2011, pp. 330-340.

\* cited by examiner

| Offsets | Octet | | | | | | | | | 0 | | | | | | | | | | 1 | | | | | | | | | | 2 | | | | | | | | | | 3 | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | Flags | | | Fragment Offset | | | | | | | | | | | | | |
| 8 | 64 | Time To Live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5). | | | | | | | | | | | | | | | | | | | | | | | | | | | | | | | |

IP Header

| Offsets | Octet | | | | | | | | | 0 | | | | | | | | | | 1 | | | | | | | | | | 2 | | | | | | | | | | 3 | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | Destination port | | | | | | | | | | | | | | | | |
| 4 | 32 | Sequence number | | | | | | | | | | | | | | | | | | | | | | | | | | | | | | | |
| 8 | 64 | Acknowledgment number (if ACK set) | | | | | | | | | | | | | | | | | | | | | | | | | | | | | | | |
| 12 | 96 | Data offset | | | | Reserved 000 | | | NS | CWR | ECE | URG | ACK | PSH | RST | SYN | FIN | Window Size | | | | | | | | | | | | | | | |
| 16 | 128 | Checksum | | | | | | | | | | | | | | | Urgent pointer (if URG set) | | | | | | | | | | | | | | | | |
| 20 | 160 | Options (if data offset > 5. Padded at the end with "0" bytes if necessary.) | | | | | | | | | | | | | | | | | | | | | | | | | | | | | | | |

TCP Header

| Offsets | Octet | | | | | | | | | 0 | | | | | | | | | | 1 | | | | | | | | | | 2 | | | | | | | | | | 3 | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | Destination port | | | | | | | | | | | | | | | | |
| 4 | 32 | Length | | | | | | | | | | | | | | | Checksum | | | | | | | | | | | | | | | | |

UDP (Alternate)

Fig. 6

DISTRIBUTED DATA SURVEILLANCE IN A COMMUNITY CAPTURE ENVIRONMENT

RELATED APPLICATIONS

This application is a continuation-in-part of U.S. patent application Ser. No. 16/058,145 filed on Aug. 8, 2018, which is a continuation-in-part of U.S. patent application Ser. No. 15/938,229 filed Mar. 3, 2018, which is a continuation of U.S. patent application Ser. No. 14/969,347 filed on Dec. 15, 2015 and issued as U.S. Pat. No. 9,979,740 B2 on May 22, 2018. This application is also a continuation-in-part of U.S. patent application Ser. No. 16/120,704 filed on Sep. 4, 2018, which is a continuation-in-part of above-referenced U.S. application Ser. No. 16/058,145 filed on Aug. 8, 2018. This application is also a continuation-in-part of above-referenced U.S. patent application Ser. No. 15/938,229 filed on Mar. 28, 2018. All the above numbered applications are incorporated by reference herein for all purposes in their entireties.

FIELD OF THE INVENTION

This invention relates generally to the field of information security.

BACKGROUND ART

Information security is an active field of academic and industrial pursuit. With the news of data breaches by hackers, and data theft or exfiltration by rogue insiders a commonplace occurrence, it is unsurprising to see many academic and professional institutions focusing their efforts to develop tools and practices for securing their computing and network environments. These efforts are largely aimed at making computing networks and infrastructure more secure against exploitative attacks from global hackers as well as from accidental or intentional data theft attempts from the inside.

There are many ways of detecting security attacks on an IT infrastructure in the prior art. U.S. Pat. No. 9,094,288 to Nucci discloses a method for profiling network traffic including obtaining a signature library with multiple signatures. Each signature represents a data characteristic associated with a corresponding application executing in the network. Then based on a predetermined criterion, a group behavioral model associated with the signature library is generated. The group behavioral model represents a common behavior of multiple historical flows identified from the network traffic. The signatures correlate to a subset of the plurality of historical flows. Then a flow in the network traffic is selected for inclusion in a target flow set, where the flow matches the group behavioral model. This match is without correlation to any corresponding application of the signatures. The target flow set is analyzed to generate a new signature which is then added to the signature library.

U.S. Pat. No. 8,448,234 to Mondaeev teaches a method of determining whether a data stream includes unauthorized data. The data stream is analyzed using a hardware filter to detect the presence of one or more set of patterns in the data stream. It is determined whether a packet in the data stream belongs to one of the data flows to be further inspected based on the analysis of the data stream by the hardware filter. A set of rules is applied to the packet to produce a rule match if it is determined that the packet belongs to one of the data flows to be further inspected. The packet is analyzed to determine if the packet includes unauthorized data using software if the rule match indicates that the packet potentially includes unauthorized data.

U.S. Patent Publication No. 2012/0233222 to Roesch teaches a system that includes a sensor and a processor. The sensor is configured to passively read data in packets as the packets are in motion on the network. The processor operating with the sensor is configured to read the data from the sensor and to originate real-time map profiles of files and file data. The processor then performs correlation and inference from the read data from the sensor.

U.S. Patent Publication No. 2015/0163121 to Mahaffey discloses a system where data is collected from a set of devices. The data is then associated with the devices, mobile application programs (apps), web applications, users, or a combination of these. Then a norm is established using the collected data. The norm is then compared with the data collected from a specific device. If there is a deviation outside of a threshold deviation between the norm and the data collected from the particular device, a response is initiated.

Non-Patent reference, "A Hybrid Model for Network Security Systems: Integrating Intrusion Detection System with Survivability" by Bhaskar, dated September 2008 proposes a holistic approach to network security with a hybrid model that includes an Intrusion Detection System (IDS) to detect network attacks and a survivability model to assess the impacts of undetected attacks. A neural network-based IDS is proposed, where the learning mechanism for the neural network is evolved using genetic algorithm. Then the case where an attack evades the IDS and takes the system into a compromised state is discussed. A stochastic model is then proposed, which allows one to perform a cost/benefit analysis for systems security. This integrated approach allows systems managers to make more informed decisions regarding both intrusion detection and system protection.

Non-Patent reference "Network packet payload analysis for intrusion detection" by Mrdovic dated 2006, explores the possibility of detecting intrusions into computer networks using network packet payload analysis. Various issues with IDS are explained in the paper. An integrated approach to IDS building is suggested. Anomaly detection process improvements are recommended. Prevailing methods for network intrusion detection based on packet metadata, headers, are also compared with the approach proposed in the paper. Reasoning behind packed payload analysis for intrusion detection is also presented. Modeling of HTTP normal and anomalous payload using artificial neural networks is suggested as the best approach in the paper.

One shortcoming of prior art teachings is that they do not apply the techniques from signature based or anomaly based intrusion detection to the area of data exfiltration. While there have been numerous attempts to do binary analysis and packet analysis for malware/virus detection for identifying new attack vectors but none have been in the areas of Data Loss Prevention (DLP) or data exfiltration. Also most of the present techniques require complex sandboxing and n-gram analysis for analyzing content.

There has not been a successful attempt at building a hybrid data surveillance system that uses a holistic approach with supervised and unsupervised machine learning for analyzing user behavior, by examining the entirety of data. The prevailing techniques do not employ an effective clustering scheme for data packets in a conceptualized hypercube and its centroid. As a part of such analysis, there also is the need for identifying file standards associated with data packets to corroborate that the packets conform to the purported file standards. Further, there is the need of performing Deep Packet Inspection (DPI) as a part of such a packet analysis for the entirety of data. Further still, there is a need for analyzing the drift of the centroid of data packets on various dimensions of analyses in response to various events in the organization. The prior art is also silent about "agent-izing" above techniques in a distributed environment to participate in a "community capture" manner.

OBJECTS OF THE INVENTION

In view of the shortcomings and unfulfilled needs of the prior art, it is an object of the present invention to provide a set of techniques for identifying security issues, of especially the Data Loss Prevention (DLP) and data exfiltration kind, by applying the learnings from Intrusion Detection Systems (IDS).

It is also an object of the invention to provide for a hybrid data surveillance system employing both supervised and unsupervised machine learning techniques.

It is also an object of the system to apply Deep Packet Inspection (DPI) and subsequence analysis to analyze each and every packet of the data being surveilled, and not just a sampled subset.

It is also an object of the invention to provide for a distributed implementation of the above techniques in a "community capture" manner.

These as well as other objects of the invention will be evident in the forthcoming summary and detailed description sections of this disclosure.

SUMMARY OF THE INVENTION

The objects and advantages of the invention are secured by a system and methods of performing data surveillance on a computer network for identifying security and/or performance issues. Such data surveillance is accomplished by establishing a baseline of data against which subsequent data packets are compared for the detection of the presence of any anomaly or a deviance. The baseline is established by combining the results of three main types of analyses for each and every packet of data transmitted/received: protocol analysis, user-behavior analysis, and packet analysis.

Protocol analysis is performed by analyzing data/network communication protocols associated with each data packet in relation to the various networking layers of the communication stack, such as TCP/IP. Subsequently or in parallel, user-behavior analysis examines the behavior of the user involved in the communication of each packet. The analysis may be at the session level of the user whereby a user session may be reconstructed from its corresponding packets, for the purpose of analysis. Subsequently or in parallel, packet analysis is performed by deeply analyzing the content of each and every data packet involved in the communication. Packet analysis is performed by augmenting to the techniques of Deep Packet Inspection (DPI).

Based on the results of the three main analytical components, all the packets involved in data communication are clustered, using an unsupervised machine learning procedure that may use any machine learning algorithms, preferably k-means clustering. Clustering is achieved by scoring/weighting every packet along the three axes or factors of analysis: protocol, user-behavior and packet content. Specifically, if a packet is determined to behave in an unknown manner when compared to the known behavior of past packets i.e. signatures/data-sets, its score is incremented.

Over time as packets are analyzed and scored by the system, they tend to form clusters or populations. The invention uses an n-dimensional hypercube to conceptualize the clusters of packets as analyzed with respect to the characteristics or dimensions of analysis. The cluster with the highest and/or the densest population is chosen to be the centroid of the hypercube. The centroid represents the normal population of the data, or its baseline. Subsequent packets are then compared against this baseline by scoring/weighting them to determine their distance from the centroid. The more the score of a packet, in terms of its unknown attributes, the more its distance from the centroid.

If this distance is far enough, that constitutes an anomaly or deviance for the packet. If the score of the packet sufficiently matches any existing signatures/data-sets, an appropriate alert is generated for the admin/user who may take remedial actions. The alert may be presented using an appropriate user interface. If the packet is anomalous but does not match any existing signatures/data-sets then a user-event may be generated where the admin/user may label the packet as an existing/known security or performance issue, or a new security/performance issue, as appropriate. Preferably, the baseline continues to automatically evolve as more data keeps getting analyzed. As such the system "learns" or calibrates its baseline, and thus adapts with time.

An anomaly/deviance observed in the data may be related to a security issue of the computer network, or preferably even a performance issue. Preferably the analytical approach taught by the invention is applied to each and every data packet of the network. Preferably, a user session may also be analyzed using the above scheme, and not just the individual packets themselves. An advantageous embodiment further utilizes machine learning algorithms, including both unsupervised and supervised components. The baselining and scoring scheme using k-means can keep the system operational and self-learning with minimal user interaction, and thus forms the unsupervised component of machine learning. When a user input is required to label a new anomaly as explained above, that forms the supervised component of machine learning. Preferably packet analysis utilizes Deep Packet Inspection (DPI). Preferably a component of packet analysis involves comparing the content of the packet or payload to ensure that it matches the file standard that the packet is purported to belong to.

Data surveillance system may be architected to include a data monitoring module whose function is to monitor each packet of incoming/outgoing data packet, and copy/mirror it for analytical purposes. The system may also have a data analysis module which is assigned the overall task of packet and/or session analysis. In conjunction with the data analysis module, there may a protocol analysis module to analyze the networking protocols of data packets, a user-behavior analysis module to incorporate the behavior of user in the analysis, and a packet analysis module responsible for analyzing the content of every packet.

While analyzing user-behavior corresponding to a packet, it may be prudent to combine the device information along with the user behavior. The user-behavior analysis module preferably considers other "like" users (or other like user/device pairs) in the organization who may be attributable to the same/similar data anomaly or deviance as may be observed for the packet in question. The data surveillance system may detect a large variety of security issues, including data intrusions, data exfiltration/theft, data loss/leak, steganographic attempts, etc. Furthermore, the system may also detect performance issues that may be attributable to a system malfunction or deterioration.

The present techniques further teach maintaining various layers of metadata associated with the various types of analyses performed by the system. Specifically, there is metadata associated with the packets, sessions, packet headers and packet payloads. This metadata is updated as a part of the packet capture regime of the data surveillance system of the present invention. There is also a session metadata layer which consists of metadata associated with a user session, header metadata layer which consists of metadata specifically related to the packet header(s), and payload metadata layer which consists of metadata specifically related to the packet payload.

Packet metadata may contain information about the packet related to its security or performance characteristics including whether the packet has a known or unknown security issue, the number of retransmits for the packet, whether there are superfluous packets in the transmission and the overall packet score when compared to the baseline, etc.

Session metadata may contain information required to reconstruct a given session. User-behavior metadata may contain information related to the particular user associated with the packet or session being analyzed, including typical applications used, geography/location, device(s), previous security issues by that or "like" users, traffic patterns, file-type usage, etc. There is also a catchall miscellaneous metadata layer that may consist of any useful information about data not easily attributable to other metadata layers. In the preferred embodiment, various analytics are performed on user-behavior and the catchall metadata layers via a metadata analytics module.

Preferably, the system analyzes data according to the disclosed techniques in real-time or on a near real-time basis. Preferably, the system analyzes the data on a batch basis by analyzing a historical version of data. This may be required to perform a forensic or chain-of-custody analysis after a security incident.

In another set of highly preferred embodiments, the drift of the centroid is recorded and analyzed to recognize patters that may be correlated to the activities of the organization. Such a pattern may be visualized on a scatter-graph/scatter-plot and used to reveal the relationship of events in the organization to the movement of the centroid. The activities or events may be caused by man such as technical or technological breakdowns of the equipment/machinery in the facility, or they could be acts of god, such as flooding or fire.

In any event, the network traffic associated with the response of the organization to such events causes the centroid to move/drift in certain patterns. The observed movement or drift of the centroid is characteristic of the response of the organization to the above events and may be recorded or analyzed over a given period of time, such as seconds, minutes, hours, days, weeks, etc. Such patterns are learned by the evolving or "rolling" baseline of the system over time and are recognized as normal events. The present design avoids issuing false positives for such events in the future, unlike the static systems of the prior art.

The payloads of the data packets are hashed using fuzzy or context triggered piecewise hashing (CTPH). The CTPH hashes of the packets are then stored in the database. As subsequent packets pass through the network, the system compares the fuzzy hashes of the packets to determine if the packets are close to a previous set of hashes associated with an event. Thus, fuzzy hashing is used to identify an anomaly in the data, such as a security attack or a performance issue. The security attack may be a data exfiltration attack/attempt. Furthermore, the payload of the packet is compared to the standard of the file that the packets are purported to belong to.

In these embodiments as well, machine learning techniques are also employed to learn the movement or the drift of the centroid with respect to the baseline. First, unsupervised learning using techniques such as k-means clustering is employed to determine the clustering of individual data packets. A human expert/administrator may then label or score the data packets associated with unknown security events or adjust the present scores of the packets, thereby forming the supervised component of the learning of the system.

In still another set of highly preferred embodiments, the above data surveillance techniques are used to establish the contexts for events of interest occurring in the organization. The events again may be man-made (security events, performance events, etc.) or due to natural causes. The context contains all the relevant information related to the event captured by the above-discussed protocol analysis module, user-behavior analysis module and packet-analysis module. The context is then provided or made available to a response team who can proactively take actions in the "kill chain" of the event earlier than otherwise possible using the prevailing techniques.

The context of the event is attached/correlated to the entries of the server logs of the network of the organization. This additional and timely context/insight allows the response team to more quickly determine if the event is a false positive or a real positive and take remedial actions on a preventive or "precog" manner. The context may also be provided to any proxy servers on the network that may automatically block the event before it causes any harm to the network. The proactive/preventive ability of such an automatic and/or manual intervention by a response team possible with the present design allows for a dynamic security policy management. It is one of the important innovations of the present design. The rest of the relevant teachings of the prior embodiments apply to the present embodiments also.

In yet another set of highly preferred embodiments, the above data surveillance techniques are deployed in a "community capture" manner. What this means is that, rather than having a single/dedicated data surveillance system attached to the network, each device of a distributed host network participates in identifying security/performance anomalies of the network from the earlier teachings. More specifically, a device or computer is first chosen as a master from amongst the various devices/computers of the distributed network. The election/selection of the master device is preferably quorum-based, and in the event of a failure/failover, a replacement master is elected. Alternatively, a backup/standby master is designated as a hot or cold standby to serve as the new/replacement master if the original master fails.

A portion/component of the system that is responsible for establishing the rolling baseline is deployed on the master device. The portion/component of the system responsible for scoring packets against the baseline is deployed on a subset or all other (non-master) devices, as an agent software/layer. Note, that it is possible to deploy the entire software system of the prior teachings on both the master and agent devices. However, the master device only builds the baseline and communicates it to the agents, and the agents scores the packets seen by their respective devices against the baseline received from the master. The present embodiments thus provide for "agent-izing" the aforementioned data surveillance techniques in a distributed environment.

The agent software running on an agent device also mirrors/copies each packet of data seen (sent/received) by that device, to the master device. The master thus receives the packets seen by all agent devices. Based on these packets, the master thus builds or establishes a baseline of data with its centroid per prior teachings. It then communicates this baseline with its centroid to the agent devices. As the baseline evolves/rolls, the master ensures that it sends incremental updates to the agents to keep them up-to-date with the latest version of the baseline.

The agents then score each packet coming in or going out of the corresponding agent device against the baseline received from the master. The scoring is performed based on the calculation of the distance of each packet from the centroid of the baseline per earlier embodiments. Based on the scoring of the packets, the agents issue an appropriate alert if a security and/or performance anomaly is detected. Each agent thus monitors the packets received/sent by its device and raises alerts based on the baseline established by the master, in a master/agent community environment. The agents may be bundled with other pre-existing agents in the distributed network in the form of a library of files to be invoked by the pre-existing agents as needed.

In one embodiment, in the event of a failure/failover of the original master, if the replacement master does not satisfy the "adequacy" or resource requirements, additional nodes are added to the master cluster in a distributed computing fashion until the adequacy requirements are satisfied. The adequacy requirements are driven by the capabilities of the original master.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

FIG. 6 shows the structure of the headers of a User Datagram Protocol (UDP) packet, a Transport Control Protocol (TCP) packet and an Internet Protocol (IP) packet, as commonly employed in internet-based communication.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
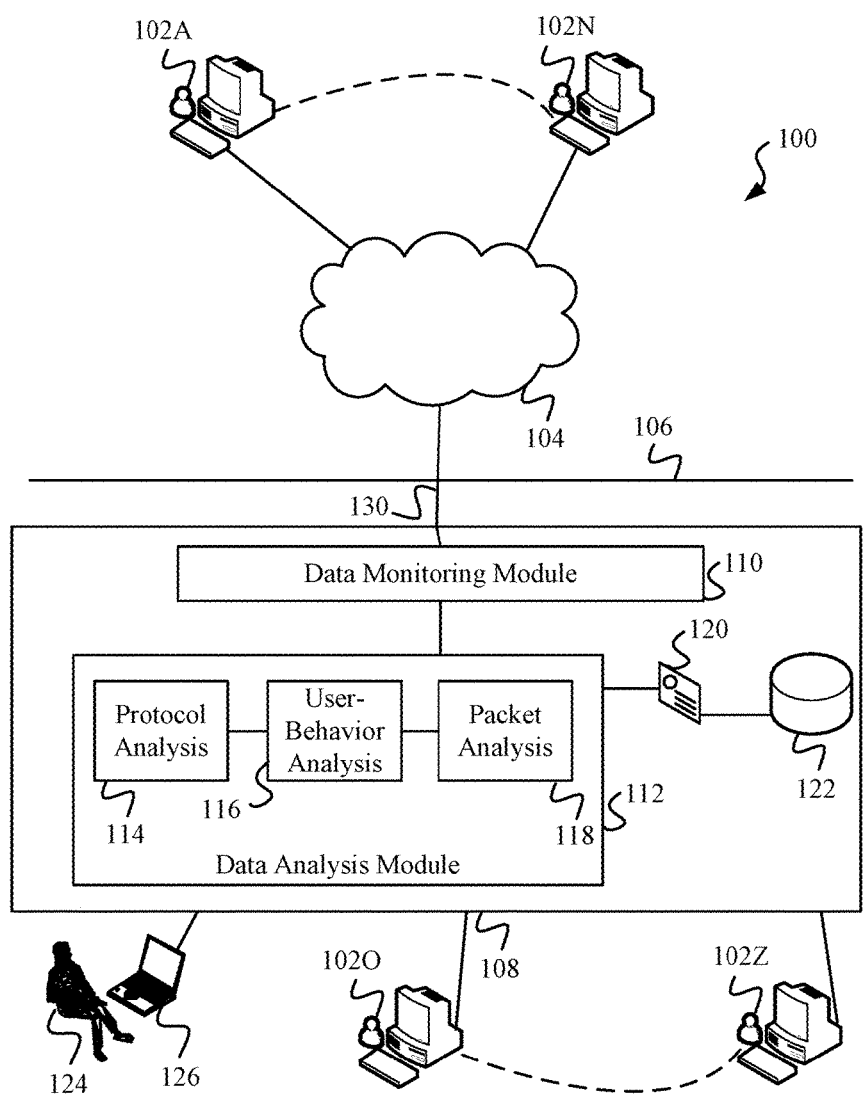
FIG. 1 is a block diagram view of a preferred embodiment of the data surveillance system according to the present invention.

The system and methods of the present invention will be best understood by first reviewing data surveillance system 100 as illustrated in FIG. 1. Data surveillance system 100 comprises any number of users 102A through 102N connected via communication network 104 to a computer network 108 of an organization. Reference numerals 102A . . . 102N may represent anywhere from a single user up to hundreds or thousands or even more users, who may connect to network 104 via various types of devices, non-limiting examples of which are desktops, laptops, smart phones, tablets, mainframes, etc. In fact, the present invention does not presuppose the presence of any users 102 at all in order to realize its benefits and they are represented in FIG. 1 to illustrate a typical operating environment where the present invention may be deployed.

Users 102A . . . 102N deploy their respective devices to establish connection via a communication network 104 to computer network 108. Communication network 104 can include a Wide Area Network (WAN), a global network like the Internet or a Local Area Network (LAN). The physical connection can be supported by any communications infrastructure including wired, optical and wireless. Analogously to users 102A . . . 102N, there are zero or more users 102O . . . 102Z connected to computer network 108 but these users are internal to network 108 or inside firewall 106 of the organization.

The interconnections shown by lines in FIG. 1 and other drawing figures of this disclosure are generally intended to be bidirectional. If a specific distinction is required to indicate a unidirectional flow, it may be indicated by an arrowhead, otherwise arrowheads will be generally avoided to improve clarity of the drawings. Those skilled in the art will understand the direction of data/information exchange between various components as illustrated in the drawings of the embodiments from their context.

FIG. 1 shows a computer network 108 whose data 130 we are interested in surveilling using the techniques of the disclosed design. Network 108 is connected to communication network 104 via an intervening firewall 106. Those skilled in the art of computer systems design and architecture will be well versed in the usage and functions of a firewall and those will not be delved into in this disclosure. Furthermore, the present invention is not limiting in its scope by requiring the use of a firewall, and a firewall may be depicted in the drawing figures, e.g. firewall 106 in FIG. 1, for the sake of completeness or for depicting a typical computing environment.

Computer network 108 further comprises a data monitoring module 110, which is in charge of monitoring the entirety of data 130 as it flows in and out of computer network 108. Data monitoring module 110 is "on the wire" and may be a software only module, a hardware device or a combination of both. A number of such hardware and software solutions for in-line data monitoring are available, including but not limited to Cain and Abel, Capsa, Carnivore, Clarified, Clusterpoint, CommView, dSniff, EtherApe, Ettercap, justniffer, Kismet, LANMeter, netsniff-ng, ngrep, Microsoft Network Monitor, SteelCentral Transaction Analyzer, snoop, tcpdump, Wireshark, Xplico, or any other custom developed or proprietary data sniffer, network tap or packet analyzer software, hardware or hybrid device/module. For a detailed overview and operating capabilities of these systems a skilled reader would consult their technical literature.

Data monitoring module 110 is operably connected to a data analysis module 112. A person skilled in the art will appreciate that the various modules illustrated in FIG. 1 as well as other illustrations of this disclosure, may be functionally combined, split or reorganized as desired and feasible, according to the systems design and architectural rules applied in practicing the teachings of the invention. The exemplary embodiments shown and explained in specific drawings and associated explanation are for illustrative purposes only. Therefore, if needed, data analysis module 112 may be combined with data monitoring module 110 or with other modules explained below, without departing from the principles of the invention. Furthermore, there are other components in a typical computer network as known to skilled artisans which may be present in computer network 108 and are not shown in FIG. 1 to prevent detraction from the instant teachings. Some exemplary components are routers, switches, other networking and storage equipment, perimeter protection systems, alarm systems, etc.

FIG. 1 also shows that data analysis module 112 further comprises a protocol analysis module 114, a user-behavior analysis module 116 and a packet analysis module 118. Once again, data analysis module 112 can be operably connected to modules 114, 116 and 118 in a number of ways. For example, they may not be a part of data analysis module 112 as shown in FIG. 1, but one or more modules 114, 116 and 118 may be external to it. Similarly, the functionality of data analysis module 112 and one or more of its sub-modules 114, 116, 118 shown in FIG. 1, may be combined into a single module without departing from the principles of the invention.

Now we will look at the functionality of modules 112, 114, 116 and 118 in much more detail. According to the preferred embodiment, data surveillance system 100 of FIG. 1 first establishes a baseline 120 of data 130 against which it compares subsequent portions or the entirety of data 130 as it flows in and out computer network 108. The job of establishing baseline 120 of data 130 as well as future comparison of data against baseline 130 is assigned to data analysis module 112.

For this purpose, data analysis module 112 of FIG. 1 uses a technique termed as "triangulation" according to the invention. Specifically, triangulation means analyzing three main characteristics or axes of data 130, (i) data/network protocol(s), (ii) user-behavior and (iii) content of each and every packet. The analyses of these characteristics of data 130 are performed by protocol analysis module 114, user-behavior analysis module 116 and packet analysis module 118 respectively. Data analysis module 112 uses the results of the analyses of the above three modules to establish a baseline 120 of data 130. It may then store baseline 120 in a storage system 122 which can be a relational database, a file system such as Network File System (NFS), or a distributed filesystem such as HDFS or Lustre. Persons skilled in the art will appreciate the vast variety of choices available for the storage and retrieval of baseline 120.

For filesystems, the non-limiting choices are Google File System (GFS), Ceph, Moose File System (MooseFS), Windows Distributed File System (DFS), BeeGFS (formerly known as Fraunhofer Parallel File System or FhGFS), Gluster File System (GlusterFS), Ibrix or a variation of Apache HDFS. For databases, the choices include, but are not limited to Microsoft Access, Oracle database, IBM DB2, Informix, PostgreSQL, SAP Hana among others, NoSQL databases like MongoDB, MarkLogic, Cloudant, Couchbase, among others. Persons skilled in the art would know where to find the easily available literature on the features and capabilities of the above products.

It should be noted that the storage of baseline 120 into a storage system 122 is for ease of subsequent retrieval and usage, and is not a requirement of the invention. In fact, many alternative designs, including in-memory/RAM storage of baseline 120, for its subsequent usage/update, are possible as will be appreciated by readers with average skill. Now let us look at protocol analysis, user-behavior analysis, and packet analysis of the present invention in more detail. In the embodiment of FIG. 1, these analyses are respectively performed by protocol analysis module 114, user-behavior analysis module 116 and packet analysis module 118.

Protocol analysis of the invention is responsible for examining the network/data/communication protocol(s) associated with any and all of the networking layers associated with the communication of data 130. People skilled in the art will recognize that the Open Systems Interconnection (OSI) model, designed with the goal of interoperability of diverse devices and systems, standardizes the communication functions of telecommunication and computing systems, independently of their underlying internal structure and technology. The OSI model canonically partitions a communication system into 7 abstraction layers. A layer is served by the layer below it and it serves the layer above it. Two communication instances at the same layer are abstracted to be connected by a horizontal connection at that layer. The seven layers of the OSI model are Physical, Data link, Network, Transport, Session, Presentation and Application.

Similarly, Transport Control Protocol/Internet Protocol (TCP/IP) model that is used for internet communication, characterizes end-to-end connectivity of communication systems specifying how data should be packetized, addressed, transmitted, routed and received at the destination. The model provides four abstraction layers that sort all related protocols according to the scope of networking involved. The layers, from lowest to highest, are the link, internet, transport and application. There are several variations of the TCP/IP model available, having anywhere from three to five layers. Regardless of the networking model deployed, the main interoperability objectives are achieved because each layer treats the layers underneath it as black-box and thus abstracts it. There is also the User Datagram Protocol/Internet Protocol (UDP/IP) which is a connectionless variant of TCP/IP and also widely used on the internet.

After the above brief introduction to networking models, for which supporting references are abundantly available on the web to the curious reader, let us turn our attention back to protocol analysis taught by the invention, and as encapsulated by protocol analysis module 114 in the embodiment illustrated in FIG. 1. Data surveillance system 100 analyzes one or more protocols associated with data 130 transmitted or received by computer network 108. The protocols being analyzed can be at various layers of the networking stack. Considering internet as the example, protocol analysis of the invention may be performed at the link, internet, transport and application layers or a combination of the above.

As such, protocol analysis module 114 of FIG. 1 may analyze transport protocol, TCP, of data 130 transmitted/received by one or more users 102A . . . 102N or 102O . . . 102Z via networks 104 and 108. For example, protocol analysis module 114 may determine that data being transmitted at Port 53 of a connection established by a user 102O of network 108 is encrypted. Those skilled in the art understand that port 53 in the TCP/IP networking model is unencrypted DNS traffic, and the fact that data transmitted/received on port 53 by user 102O is encrypted, may be a sign that the port is being used to send privileged data from inside network 108 to an outside destination.

The above may be a typical exfiltration attempt, where a legitimate user 102O of network 108 is attempting to steal or smuggle private data or confidential data belonging to the organization/entity owning and operating network 108, to an outside unauthorized destination. Private data can be customer data, employees' personal information, company's confidential product information, etc., and the outside destination may be cloud storage, such as Dropbox.com. Such discovery of a security issue by protocol analysis module 114 is a part of the triangulation process, and is combined with the other two components of triangulation explained below, and then finally scored against established baseline 120 as will also be explained below.

User-behavior analysis, encompassed by user-behavior analysis module 116 in the embodiment of FIG. 1, is concerned with the detailed analysis of the behavior of the users of network 108. A user analyzed by module 116, may be one of users 102A . . . 102N outside of network 108, also commonly said to be outside of its firewall 106, or the user may be one of its internal users 102O . . . 102Z, inside its firewall 106. According to the invention, protocol analysis and packet analysis (as explained below), are combined with the historical and current activities/behavior of the user and other "like" or similar users. This combination allows data analysis module 112 to establish baseline 120 for data 130 as will be explained further below. The historical and present activities/behavior of the user that may be combined with the results of protocol and packet analyses, include but are not limited to, the types of applications used by the user and other like users, user's role/permission level and that of other like users, typical session length, typical data traffic patterns/data-types, past security or performance issues, etc.

Packet/payload analysis, encompassed by packet analysis module 116 in the embodiment of FIG. 1, is concerned with performing a deep inspection and analysis of the payload of every packet of data 130 transmitted/received by network 108. As explained above, the results of this analysis are used in defining baseline 120 of data 130 by data analysis module 112. The present invention utilizes techniques oftentimes called Deep Packet Inspection (DPI), also referred to as complete packet inspection and Information eXtraction (IX), for examining the header as well as the data part of each packet as it passes in and out of network 108.

Since there are multiple headers of an IP packet, network equipment only needs to use the first of these (the IP header) for normal operation, however inspection of the second header (TCP, UDP etc.) is normally considered to be shallow packet inspection, also sometimes called Stateful Packet Inspection, in the prevailing art. In contrast, the present invention performs an analysis of all the headers and the payloads of data 130, for every packet of data 130 rather than just a sampled subset of packets. Such a deep analysis of the entirety of data traffic may be computationally demanding, which is why the present invention preferably utilizes clustered and elastic computing (EC) resources to operationalize its functions. As will be explained further below in reference to various embodiments, DPI may also involve performing fuzzing or context triggered piecewise hashes (CTPH) hashing of the payload of the packets and storing the values of the CTPH hashes in database 122.

Furthermore, among the various aspects of packet data analyzed by packet analysis module 118, is preferably the comparison of the payload to the type of file standard that the packet belongs to. Specifically, module 118 compares each packet of data to the typical characteristics associated with the file format associated with the file to which the packet belongs, in order to determine whether the data packet is authentic or has been otherwise manipulated or tampered with. Such purposeful tampering and manipulation is the hallmark of an exfiltration attempt whereby a rogue admin, or a rogue user or device, or a hacker that has intruded into network 108, for example by stealing the credentials of a legitimate user and is now impersonating as him/her. The thief then hides the privileged data in the manipulated data packets, and transmits them outside of network 108 where he/she may complete the theft by stripping the data out of the packets and then reassembling it.

Generally, every binary file format such as JPEG, MPEG or PDF has certain data characteristics that are observable in its data packets, and packet analysis module 118 looks for the telltale signs or characteristics of that data by comparing the contents of the payload to the file standard that the packet belongs to. The determination of the purported file standard may be made by looking at the file extension, e.g. .pdf, .jpeg, .mpeg/.mpg of the file of the data packet, or by looking at the file standard in a header of the data packet, or by other data examination means. Packet analysis module 118 may further analyze other attributes of the packet including determining if there is any suspicious manipulation of the various fields of the headers (UDP, TCP, IP), including Offset, Octet, Window Size, etc. The results of the analysis performed by packet analysis module 118 are then combined with the analytical results of protocol analysis module 114 and user-behavior analysis module 116, via the process of triangulation as provided by the instant design.

Let us now take a detailed look at how data analysis 112 module performs triangulation, by using the results of protocol, user-behavior and packet analyses, to establish baseline 120 for data 130. According to the invention, each packet of data is analyzed and placed in a cluster, utilizing a clustering process. Preferably, the clustering process utilizes k-means clustering. k-means clustering is a well-known technique whereby an objective function J minimizes the within-cluster sum of squares i.e. sum of distance functions of each observation or packet in the cluster, to the center of the cluster. It is often employed in machine learning algorithms and programs for classification of data. Mathematically, $$J = \sum_{j=1}^{k} \sum_{i=1}^{n} \left\| x_i^{(j)} - c_j \right\|^2 \qquad \text{Eq. 1}$$

In Eq. (1) above, J is the objective function to be minimized, n is the number of packets/cases analyzed, k is the overall number of clusters, $x_i^{(j)}$ is the specific packet being analyzed with respect to its distance from center $c_j$ of cluster j.

The distances in above k-means clustering are based on a scoring or weighting scheme. The scoring/weighting scheme preferably adds 1 to the score of a packet each time the packet is determined to be an "unknown". This determination is based on the analytical result of the packet by protocol analysis module 114, user-behavior analysis module 116 and packet analysis module 118, along the three axes/factors, protocol, user-behavior, packet content respectively. This is done for each and every packet of data 130. The reader is instructed that although a natural place for implementing the above scoring/weighting scheme is data analysis module 112 in the embodiment of FIG. 1, the scheme can just as well be split into respective components and implemented in the individual modules 114, 116 and 118. A skilled reader will appreciate the variety of available implementation options and choices for implementing the analytical functions explained herein.

During the course of the real-time operation of data surveillance system 100 of FIG. 1, and/or while operating on a historical version of data 130, each packet is thus analyzed and clustered according to Eq. (1). Over time, the packets are thus clustered form various populations or clusters of packets. After a sufficient number of packets have been clustered, the cluster with the highest density of clustered packets is determined to be the centroid of an n-dimensional "hypercube" of data 130. Thus, every time there is an addition to the score of a packet as per above teachings, the packet moves away from the centroid of the hypercube.

Because the hypercube is n-dimensional where n may be greater than three, corresponding to the above three main axes/factors i.e. protocol, user-behavior and packet content, a highly preferred variation of the present embodiment may involve a more granular scoring/weighting scheme corresponding to each dimension of the hypercube. In such a variation, each dimension of the hypercube would form a specific, granular characteristic—which may still roll up to one of the three main axes/factors, protocol, user-behavior, packet content. However, as opposed to scoring/weighting the packets in a composite fashion along the three main axes/factors above, an individual score along each granular characteristic of the packets may be maintained. Obviously in such a variation of the present embodiment, the analytical modules 112, 114, 116 and 118 may also be reorganized/restructured accordingly. An alternate way to conceptualize such a variation of the embodiment is to consider that each of the three main axes/factors is itself multi-dimensional in the hyperspace that the hypercube resides in.

According to the invention, the centroid thus determined represents the "normal" population or baseline of data 130. The normal population is also the densest population of the hypercube, as most of the data traffic would typically fall in this category. As more packets are analyzed, they may be partitioned/clustered close to the centroid or baseline, or farther away. The corners and edges of the centroid represent the known anomalies in the data, also known as signatures or data-sets. The further a packet is from the centroid, the more likely it is to be indicative of an anomaly or a deviance, and the closer it is to a corner or an edge of the centroid, the more likely it is to be an anomaly/deviance of a known type or simply a "known". Such an n-dimensional hypercube 180 and its centroid 182 as taught by the invention are visualized in FIG. 2, where centroid 182 is representative of the normal population of data packets.

Figure 2:
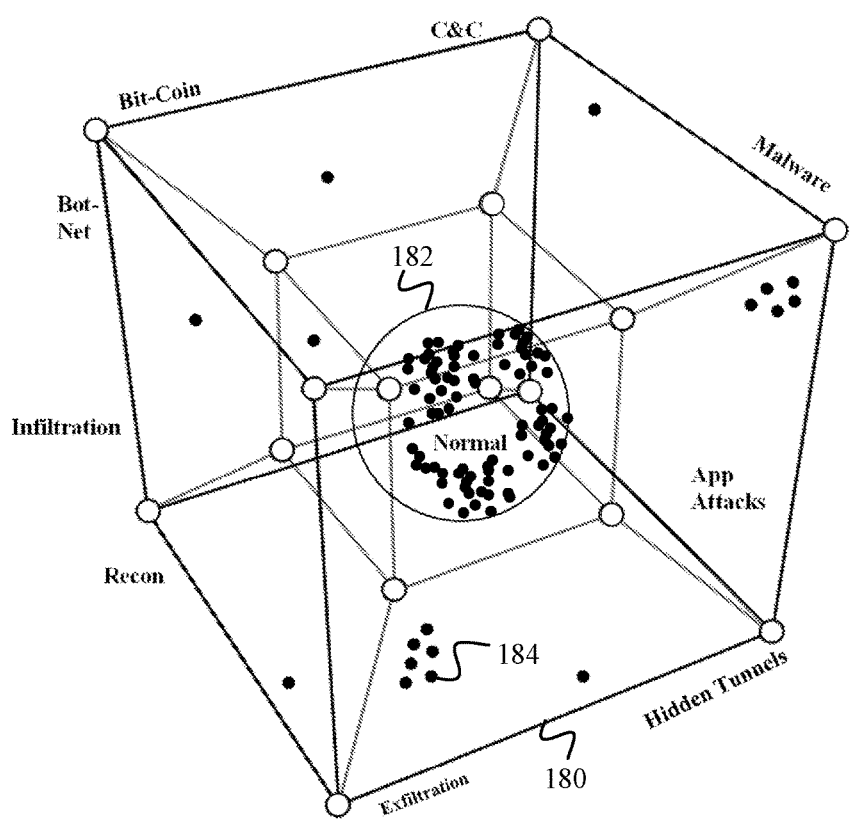
FIG. 2 is a conceptual illustration of an n-dimensional hypercube employed in determining the baseline of the data surveilled according to the invention.

Hypercube 180 of FIG. 2 also depicts its corners and edges that are labeled according to known security anomalies in data. FIG. 2 further shows as black dots, individual packets that have been partitioned and placed in hypercube 180 by data analysis module 112 of FIG. 1. One such packet is labeled by reference numeral 184 although the drawing shows several such packets. Notice that there are also two sub-clusters or sub-populations, one in the upper right hand corner and the other to which packet 184 belongs, but these are not large enough to challenge centroid 182 which has the densest population of packets.

The determination of hypercube 180 along with its centroid 182 representative of normal data packets, is called baselining in the instant invention. It is this baseline 120 in FIG. 1 that is then optionally saved locally/remotely, using one of the many techniques known in the art, and then accessed as data packets continue to be analyzed by system 100. In a highly preferred embodiment of the invention, as the operation of network 108 in system 100 continues, existing baseline of data 130 as determined by hypercube 180 continues to evolve. This evolution or "rolling" of baseline 120 allows the instant invention to automatically learn from data and calibrate itself, by adapting to what is now considered normal and what types of data packets to raise a security or performance alert on.

The evolution of the baseline is also sometimes referred to as "centroid drift" because of the movement of the centroid of the data. In an interesting scenario, a hypercube may have a split centroid, with two or more almost equally dense populations of data. In such a situation, data analysis module 112 of FIG. 1 will choose any one of the centroid for baseline 120. Furthermore, such a situation is most often resolved as packets continue to get analyzed and clustered and one of the populations takes over in density to assume the role of the centroid.

Employing the dynamic or rolling baseline technology of the instant invention taught herein, a system may continuously and automatically evolve or calibrate its definitions of a threat and normal data. This is crucial in the highly dynamic threat environment of today's networks that are constantly exposed to external as well as internal threats from potentially rogue admins or employees. Knowledge from these updated "learned data-sets" allows a computer network of the present invention to automatically stay up to date with respect to various security threats, particularly of data theft/exfiltration types. The unsupervised machine learning afforded by k-means or other machine learning techniques known in the art, allows the system to stay operational while requiring minimal input from a human user/admin. In contrast, a static baselined system constantly requires user input to properly label or mark each instance of data that might have a security issue.

Data anomalies that lie close to the edges and corners of hypercube 180 of FIG. 2 are flagged as suspicious or having "known" indicator(s) of compromise (IDC). In the event that a particular data point is far away from centroid 182 but not close to a known anomaly (represented by an edge/corner) or does not sufficiently match any known signature/data-set of anomalies, then the present invention generates a user event. Such an anomaly is also called "unknown" anomaly/deviance when compared against baseline 120 conceptualized by hypercube 180. The corresponding user event may inquire an admin 124 (see FIG. 1) with appropriate connectivity to network 108, in the example of FIG. 1 depicted by laptop 126, to classify or label the data packet in question.

The above may be accomplished via a user-interface for admin 124 (not shown) using which admin 124 may label an individual data packet, an entire user session, or even the user himself/herself accordingly. Such a user event forms the supervised component of machine learning of the present invention, aside from the unsupervised component relying on various algorithms including k-means explained above. The data surveillance system 100 of the instant invention is thus a hybrid system for detecting exfiltration attacks as well as other security/performance issues in computer network 108, comprising both unsupervised and supervised machine learning components.

Let us take a concrete example of a data anomaly detected by the present embodiment of the invention. Let us assume that the triangulation process carried out by data analysis module 112 (see FIG. 1), detects that a user 102O has a sudden spike in the number of received video data packets. Knowledge about the identity of user 102O may be obtained by utilizing a directory service, such as Lightweight Directory Access Protocol (LDAP), an Active Directory (AD), or any other directory service known in the art.

The detection of the data spike is done by applying the triangulation process taught above to analyze data protocol(s) of data associated with user 102O, user-behavior analysis to determine the historical data traffic patterns of user 102O and the contents of every packet of the data stream of user 102O. These analyses performed by protocol analysis module 114, user-behavior analysis module 116 and packet analysis module 118 respectively reveal that (i) nothing was abnormal as far as data protocols are concerned i.e. the communication used standard internet protocol stack including TCP/IP, DNS, ports, etc., (ii) user 102O does not have a history of big video data downloads in his/her sessions, and (iii) packet content for 1 million consecutive packets contained mpeg data.

At this point, data analysis module 112 determines that the million and $1^{st}$ packet that is currently being analyzed and found to be mpeg causes an unknown anomaly when compared against baseline 120. In other words, the million and $1^{st}$ packet is away from centroid 182 (see FIG. 2) but not close to any of the edges or corners of hypercube 180. In other words, it does not match any of the known signatures/data-sets of anomalies. Data analysis module may then ascertain if a similar issue has been associated with user 102O in the past, or with other like users similar to user 102O. Likeness may include matching user attributes such as device(s) used, location/geography of user/device, role in the organization, permission levels, job-title, etc. Let us assume in this case, user 102O is similar to or like user 102Z.

Upon further investigation, module 112 may determine that recently in the past, a user event was generated for user 102Z in response to an unknown issue, and the issue was labeled by the admin to be a new device such as iphone (or a new/popular game) provided to or downloaded by user 102Z. The new iphone (or game) for user 102Z resulted in a spike of video downloads for user 102Z. Consequently data analysis module 112 may conclude that user 102O must also have a new iphone (or the same new/popular game) and labels the million and $1^{st}$ packet accordingly. At this point such a labeling may cause data analysis module 112 to create a new dimension or corner of hypercube 180, in other words a new signature or a "learned data set", by having a new "known". The new known may be called a "new iphone" (or the new/popular game) and the million and $1^{st}$ packet now has a known anomaly. Alternatively, it may still choose to generate a user event for user 102O to be sure.

It is advantageous that as a part of the triangulation process, data analysis module 112 analyzes data 130 utilizing the tuple or pair user/device. The pair user/device serves as the origination point of data analysis, with or without the knowledge of the identity of the user. Explained further, in the above example, it is possible that the identity of user 102O is unknown. This may be the case in scenarios including, that network 108 of FIG. 1 does not have a proper directory service or an equivalent user administration capability, or such a capability is temporarily unavailable. In such a scenario, data analysis module 112 would use the IP address of the device for anomaly detection. It may then look at other like devices to see if a similar anomaly, data spike in the above example, has been associated with them. It is also possible that the identity of user 102O becomes known at a later point as a part of the user/device pair.

Figure 3:
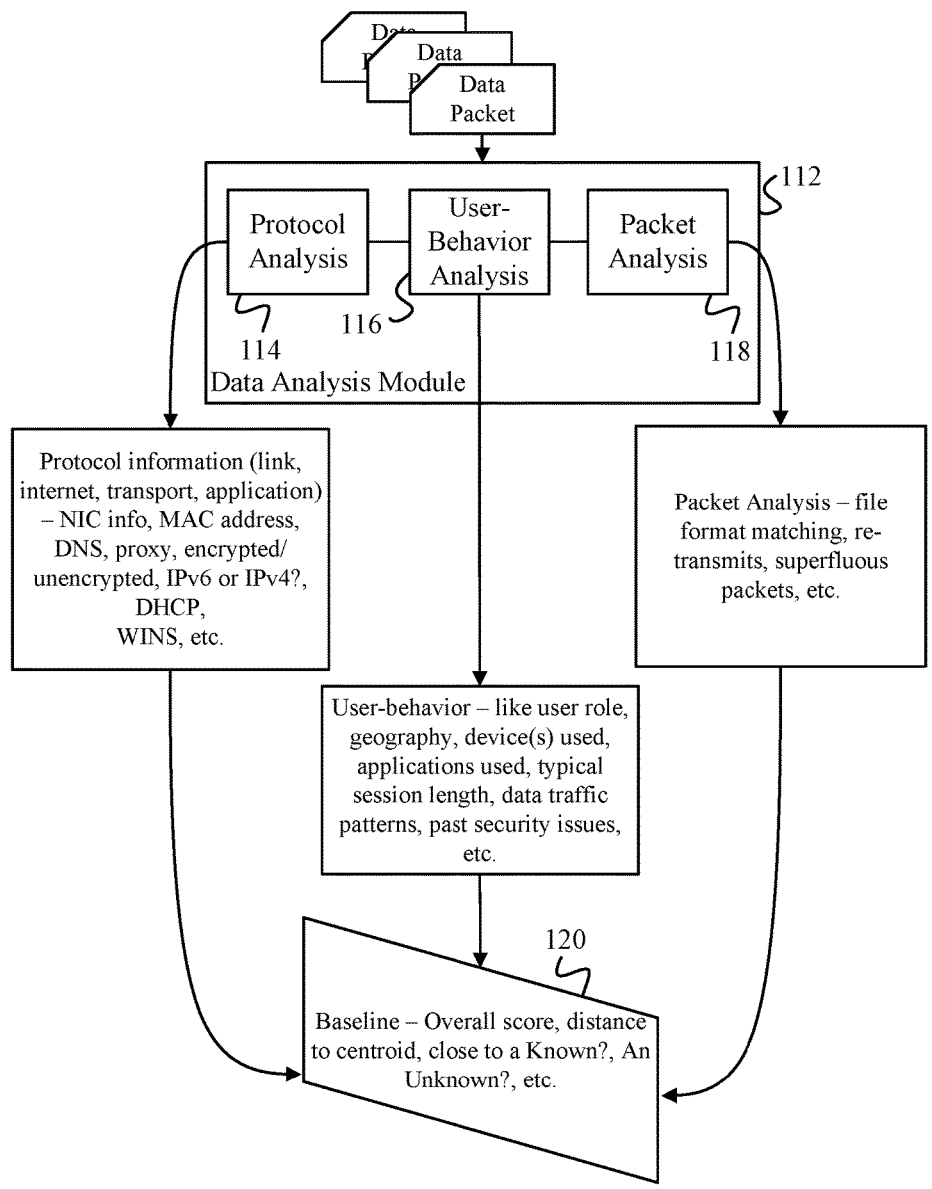
FIG. 3 is a detailed overview of the various analytical modules and their associated functions.

FIG. 3 shows in more detail the functionality of data analysis module 112 as taught above. Specifically, protocol analysis module 114 analyzes each packet for networking/protocol information according to the various networking layers explained above, including but not limited to, Network Interface Controller (NIC) info, Media Access Control (MAC) address, Domain Name Server/Service (DNS) info, proxy info, whether data is encrypted or unencrypted, whether data is IPv6 or IPv4, Dynamic Host Configuration Protocol (DHCP) info, Windows Internet Name Service (WINS) info, etc. User-behavior analysis module 116 adds user-behavior information to the analysis, including but not limited to, user role/group, location/geography, device(s) used, applications used, typical session length, data traffic patterns, typical amount of uploaded/downloaded data, past security issues, etc. User-behavior analysis may further include similar information from "like" users as explained above.

Packet analysis module 118 adds packet related analytical information augmenting to DPI techniques, including but not limited to, whether content matches the file format/standard, number of re-transmits, number of superfluous packets, etc. A high number of re-transmits could be indicative of a data theft attempt, where an insider may be exfiltrating data by hiding it in retransmitted packets, and reassembling them at the other end. Similarly, a high number of superfluous packets may also signal a data exfiltration attempt wherein the data thief attempts to conceal private data in superfluous packets and reassembles the stolen data at the other end. Another anomaly/deviance may be present when packet analysis module 118 determines packet headers to be very dense i.e. devoid of white spaces. That is generally a sign of data manipulation by a thief with the intent of stealing data in TCP/UDP/IP headers.

The analyses results from modules 114, 116 and 118 are then collected to form a baseline 120 for data as shown in FIG. 3. Baseline 120 would contain all the relevant information that helps properly categorize the analyzed packet of data according to performance or security criteria. This information includes but is not limited to, the overall score for each packet along the three axes/factors or types of analyses i.e. protocol analysis, user-behavior analysis and packet analysis. It may further include distance to current centroid 182 of baseline hypercube 180 (see FIG. 2), whether the packet has any known security/performance issues, whether it has any unknown security/performance issues that may require a user input to label it as described above, etc.

It should be remarked that modules 114, 116 and 118 may perform their functions in parallel or sequentially based on the particular design choices behind the system. In particular, for a sequential design, the results of protocol analysis module 114 may be fed to user-behavior analysis module 116 which may then add the results of user-behavior analysis to it. The combined results of both these modules may then be fed to packet analysis module 118 which may further add the results of packet analysis to it. As already stated, the functions of modules 112, 114, 116 and 118 may be combined, split, overlapped as needed to satisfy given architectural and design goals behind the implementation of system 100 (see FIG. 1).

Figure 4:
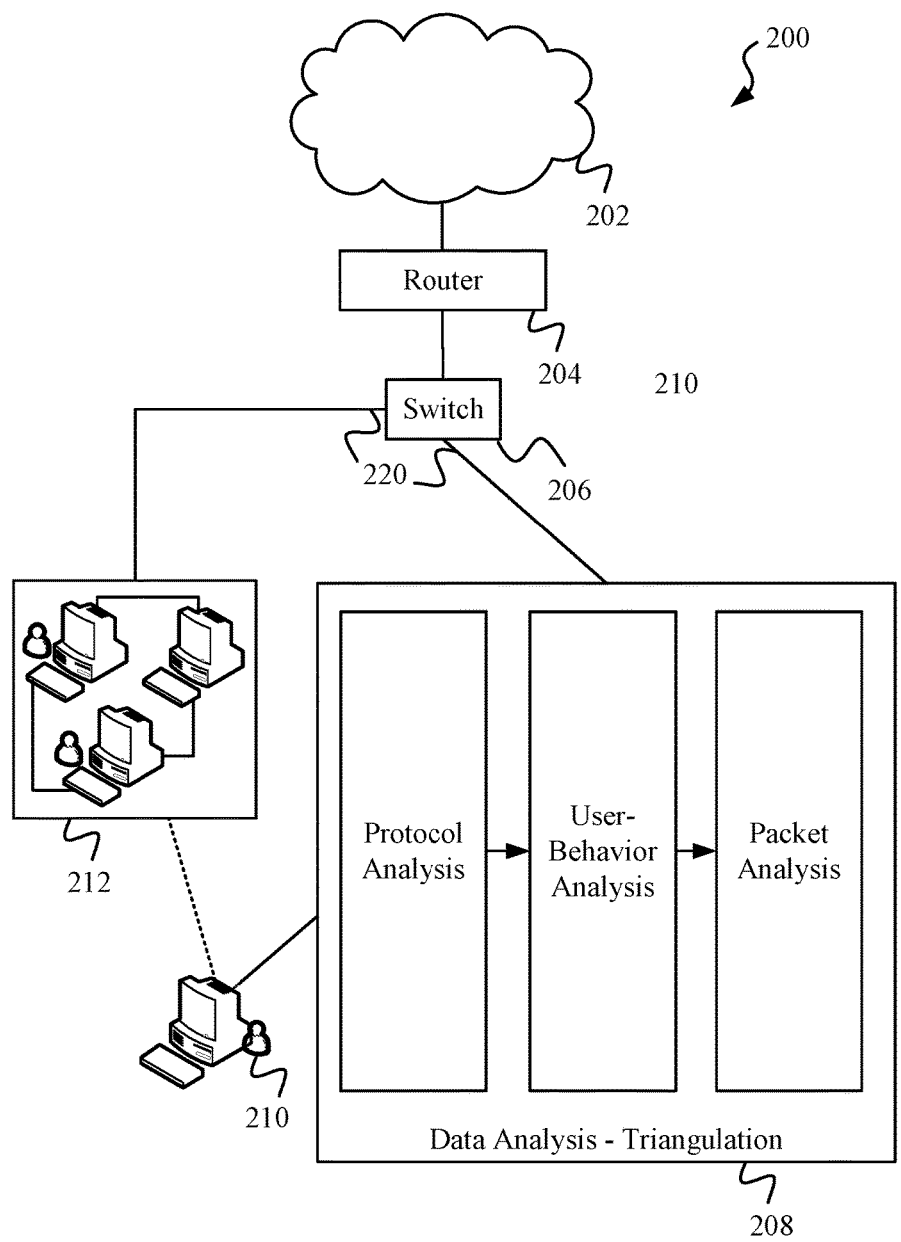
FIG. 4 is an alternative embodiment illustrating the analytical components of the data surveillance system of the invention, along with the network being monitored/surveilled and other networking equipment.

Let us now look at another embodiment of the present invention illustrated in FIG. 4. FIG. 4 shows a computer system 200 and a computer network 212 whose data we are interested in surveilling. Computer network 212 is a typical computer network in the sense that it has any number of devices/computers that are interconnected, any number of users with those devices and any type of networking hardware, software, operating systems and storage devices installed on those computing machines. Computers or computing machines of computer network 212 may also form a distributed system such as Hadoop, having a distributed file system, such as Hadoop Distributed File System (HDFS). Computer network 212 of FIG. 4 is further connected to the internet 202 via a network router 204 and a switch 206. Switch 206 mirrors data 220 coming in and out of computer network 212 to a data surveillance system 208 of the instant invention using any number of data replication/mirroring techniques known in the art, such as, port replication/mirroring.

FIG. 4 also shows the mirrored copy of data 220 that is provided to system 208 for analysis. Note that it is possible, that system 208 may utilize additional data streams and/or other computing resource. Those additional data streams/resources that may be present are omitted for clarity. Port mirroring/replication allows the entirety of data 220 coming in and out of network 212 to be monitored by system 208. That is why data surveillance system or solution according to the present invention is also sometimes referred to as an "on-the-wire" or "in-line" solution. In order to perform its requisite functions of data surveillance for computer network 212, system 208 analyzes each packet of its mirrored copy of data 220 according to the above teachings. Specifically, data surveillance system 208 performs protocol analysis, user-behavior analysis and packet analysis using the techniques termed as triangulation in the present invention, and according to the aforementioned explanation in reference to FIG. 1-3. Notice that in the embodiment shown in FIG. 4, we have chosen these analytical steps to be performed sequentially, as indicated by the arrows between the three analytical modules, although as explained above, this is not a requirement of the invention.

FIG. 4 also shows a user 210 of data surveillance system 208 who may be in charge of performing the surveillance, monitoring of the results of the analyses, and providing any user input as explained above, using an appropriate Graphical User Interface (GUI). The GUI may also have reports and alerts that can be configured according to various security settings of the software application of system 208. Specifically, a higher security setting may prompt more user events to be generated, for proper labeling of data packets that are considered "unknowns". The user events may prompt user 210 for this purpose. Note that user 210 may also be the admin of computer network 212 (as indicated by the dotted line between user 210 and network 212).

Alternatively, there may be a separate admin for computer network 212 and a dedicated security analyst user 210 may be specifically in charge of system 208. Those skilled in the art will recognize the abundance of network and user configuration choices available in the design and operation of system 208 and network 212.

Data surveillance system 208 surveils data 220 of computer network 212 as described above, preferably on a real-time or near real-time basis. In an alternative variation, system 208 analyzes data 220 on a batch basis "after the fact" i.e. after a breach or a security incident has occurred. Such may be the case where the present invention is practiced for forensic analysis of data, to determine the chain-of-custody of data. Further, this may also be the case if data analysis needs to be performed on a past or historical version of data. A reason for doing such historical analysis may be to determine the right security policies for network 212 for the future.

Another reason for doing such historical analysis may be to properly calibrate data surveillance system 208 for the future. As an example, if a given scoring/weighting scheme would have generated insufficient number of unknown anomalies when "back-tested" or run on past data that had allowed a security or performance incident to happen, then it may be appropriate to make the criteria for determining the known anomalies stricter. Further, it may also be prudent to increase the incremental score (distance from the centroid) for certain anomalies so that they will be flagged/detected as an anomaly/deviance.

It should be remarked here, that the data surveillance system as taught in the present invention is not an access control or enforcement system i.e. it does not maintain and enforce security policies. That job is left to the prevailing security infrastructure of the computing environment. Instead, the present invention teaches data surveillance techniques that allow one to perform a comprehensive and an unprecedented level of forensic analysis on data, on a real-time, near real-time or a batch basis. The results of the analysis are made available to the authorized super/root users or admin via an appropriate user interface, who are in charge of updating and enforcing security policies through available security and system tools. The user interface may be a GUI, or a web based application accessible over the internet/intranet.

There are a number of additional design options for implementing the above teachings within the scope of the invention, as will be appreciated with people skilled in the art. A set of embodiments of the invention maintain various layers of metadata (data about data) associated with the various types of analyses performed by the system. Specifically, there is metadata associated with the packets, sessions, packet headers and packet payloads. This metadata is updated as a part of the Packet CAPture (PCAP) regime of the data surveillance system of the present invention.

Figure 5:
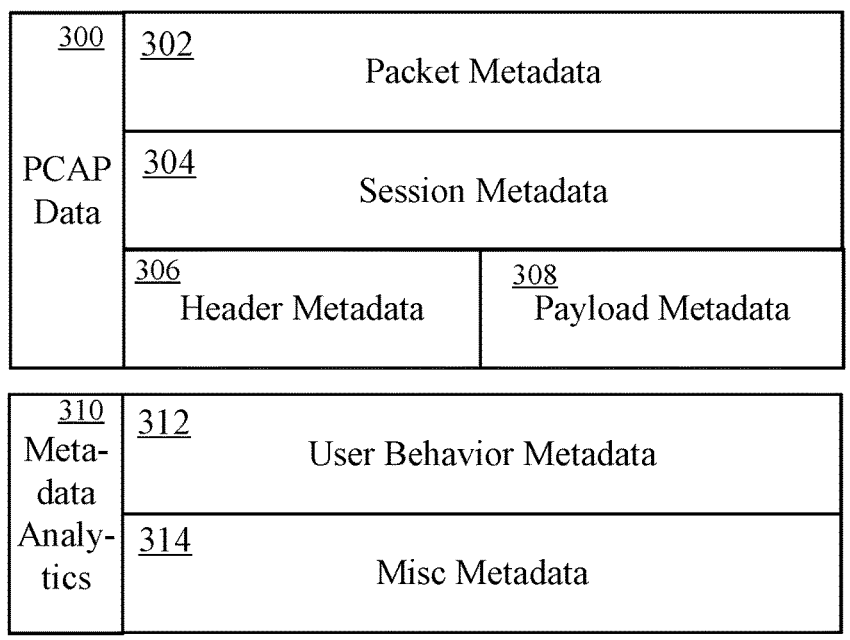
FIG. 5 shows the metadata layers associated with the analytical functions according to the invention.

This is visualized in FIG. 5 where PCAP data 300, which is the actual packet data being captured and monitored by the system, has packet metadata layer 302 which consists of the overall metadata for each packet. It also has a session metadata layer 304 which consists of metadata associated with a user session, header metadata layer 306 which consists of metadata specifically related to the packet header(s), and payload metadata layer 308 which consists of metadata specifically related to the packet payload. Metadata 302 may contain information about the packet related to its security or performance characteristics including whether the packet has a known or unknown security issue, the number of retransmits for the packet, whether there are superfluous packets in the transmission and the overall packet score when compared to the baseline, etc.

The above comparison may be based on any number of machine learning algorithms, including k-means clustering. Metadata 304 may contain information required to reconstruct a given session, whether the session has known or unknown security issues and the session score when compared against a session baseline according to the above taught techniques. While analyzing a complete session, the system may also consider other "like" sessions, while ascertaining if a known or unknown anomaly or deviance is attributable to the session. Analogous to the likeness feature of users taught above, likeness in sessions may be based on attributes including session length, applications involved, ports used, protocols used, whether encrypted or unencrypted, etc.

The embodiments leveraging metadata layers visualized in FIG. 5, also have a user-behavior metadata 312 that may contain information related to the particular user associated with the packet or session being analyzed, including typical applications used, geography/location, device(s), previous security issues by that or "like" users, traffic patterns, file-type usage, etc. There is a catchall miscellaneous metadata layer 314 that may consist of any useful information about data not easily attributable to other metadata layers. Finally, the system of the present invention may also allow various analytics to be performed on metadata layers 312 and 314 via a metadata analytics module 310.

Depending on the specific embodiment, module 310 may also include a baselining and scoring/weighting mechanism for user-behavior and other security or performance related assessments of the user. It is also conceivable to have module 310 maintain individual baselining and scoring/weighting mechanisms for packets and/or sessions, for each of the three main factors/axes as taught above i.e. protocol analysis, user-behavior analysis and packet analysis. Such a concept may even be extended more granularly to every characteristic of analysis, above and beyond the three main factors/axes.

FIG. 6 shows a detailed overview of the header portions of a TCP packet, a UDP packet and an underlying IP packet. This is exemplary of a typical transmission over the internet. Those skilled in the art will understand the differences between UDP and TCP transmissions and those will not be delved into in this specification. The present invention monitors/captures and analyzes the packet headers including all the fields shown in FIG. 6 according to the above teachings. Clever intruders and data thieves can manipulate the various fields of packet headers and the corresponding payload of the packet (not shown) to their advantage.

The attacks come in an increasingly large variety and with increasing sophistication. As a non-limiting example, a data thief may manipulate the Sequence Number, Window Size, and Options fields of a TCP packet, to hold a payload of stolen data. The present invention can detect such illegitimate attempts applying the combination of protocol analysis, user-behavior analysis and Deep Packet Analysis (DPA). We use the acronym DPA here to emphasize that the present invention deeply Analyzes and not just Inspects packets, and hence the acronym DPA.

The embodiments of the invention are able to detect the above attack because the packets/session in question when analyzed along the three factors/axes, protocol analysis, user-behavior analysis and packet analysis, will be far away from the baseline centroid of the data. Therefore the system will raise a security issue of type known or unknown as explained above. For a known issue, an appropriate alert may be raised to the admin who may then shut down the user session and/or take other remedial measures. For an unknown issue, the admin may also be prompted to properly label this packet/session or security incident so that the data surveillance system can learn from this supervised component of machine learning.

An embodiment of the invention uses trained datasets of known anomalous behavior and security/data attacks for packet/session analysis, utilizing prebuilt datasets or signatures for known anomalies of data, especially protocols and packet contents. In an analogous fashion, another embodiment preferably uses traffic trace patterns or datasets and respective known signatures, while still preferably, any combination of both the above datasets may be used. In a variation of the above embodiments, the scoring/weighting of packets/session may be performed along many more than just three axes/factors i.e. protocol, user-behavior and packet content of the earlier embodiments. In such a variation, each dimension of the hypercube may be an independent axis/factor along which every packet of data or session is analyzed.

These or a variation of the above embodiments may also employ a technique similar to the High-Low card counting strategy of the card game Blackjack. This technique is employed in the scoring/weighting scheme used to determine where in comparison to the established baseline, a given packet/session may lie with respect to the centroid (of the corresponding hypercube). Specifically, in this variation of the scoring/weighting scheme each packet/session is assigned an initial score. Then as the packet/session is analyzed for each known anomaly/deviance, a predefined score, usually +1, 0 or −1, is added to it, depending on the type of the known anomaly deviance to which the packet/session is being compared. The resulting score of the packet/session determines its distance with respect to the center of a cluster or to the centroid of the established baseline as taught above.

Using the techniques described above, the present invention builds the data-sets for user-behavior over time, which when combined with the other components of analyses as taught above, render the system to be much more accurate, and with far fewer false positives (less than 1%). While particularly suited to data loss/leak prevention and steganographic attacks, because of the wide applicability of the above taught techniques, the data surveillance system of the present invention is capable of detecting a large variety of security issues. These include, but are not limited to, intrusion attacks, malware/viruses, data theft or exfiltration or steganographic attacks, data leaks and data loss attacks, denial of service attacks, Advanced Persistent Threats (APT's), any Data Driven attacks, etc.

Similarly, the present invention is capable of detecting performance issues that may result in the creation of an anomaly when compared to the baseline. For example, a broken or malfunctioning network card may cause an excessively large number of data packets to be dropped, resulting in a large number of retransmit attempts. Such a situation can be flagged for the admin or security/performance analyst as taught above, who will conclude that the cause is not of a security nature, but rather a system malfunction or deterioration requiring appropriate maintenance. Other performance related issues may also be detected by various embodiments in practice.

In another set of highly preferred embodiments, the previously noted "drift" of the centroid is analyzed and recorded by the present techniques. Such a drift or movement of a centroid 352 is further visualized in FIG. 7 in a cube 350 with the three axes of protocol analysis, user-behavior analysis and packet, content or payload analysis. It is interesting to note that during the course of a given time period, such as a second, a minute, an hour, a day, a week or a month or any given time period, the drift of centroid 352 exhibits a pattern. Such a pattern may or may not be highly repetitive, but recurring enough to characterize as a pattern. Given enough familiarity with the various patterns of drift of the centroid, certain insights about the organization can be made.

For example, a given pattern of centroid 352 may be correlated to a certain event in the organization. Specifically, the pattern may be related to the reaction/response of the organization to the event. In one exemplary embodiment, the event may be a technical/technological breakdown in the organization and its response to such a breakdown. For example, if the organization is a semiconductor manufacturer, the shutdown of a semiconductor fabrication (Fab) line may be a critical event, in response to which a lot network traffic is generated by the employees, customers or other affiliated parties of the organization. Such traffic may be emails, voice over IP (VoIP) calls/messages, network queries, etc.

Figure 7:
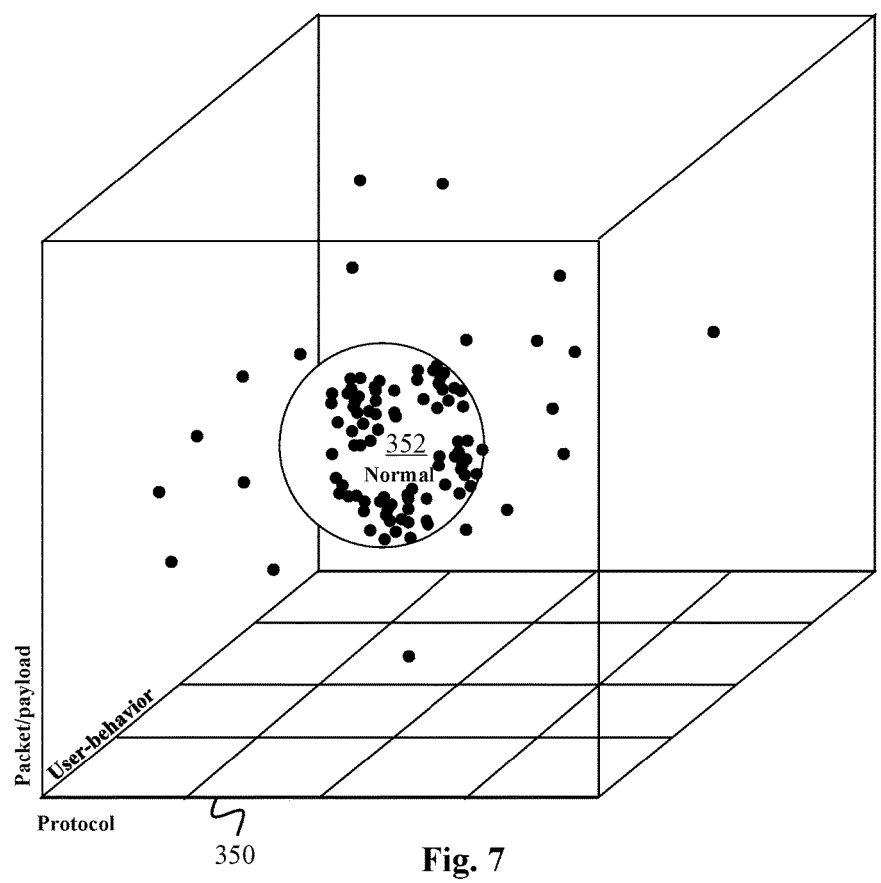
FIG. 7 shows the centroid of normal population of data packets in a three-dimensional cube having protocol, user-behavior and payload axes along which the individual packets are plotted.
Figure 8:
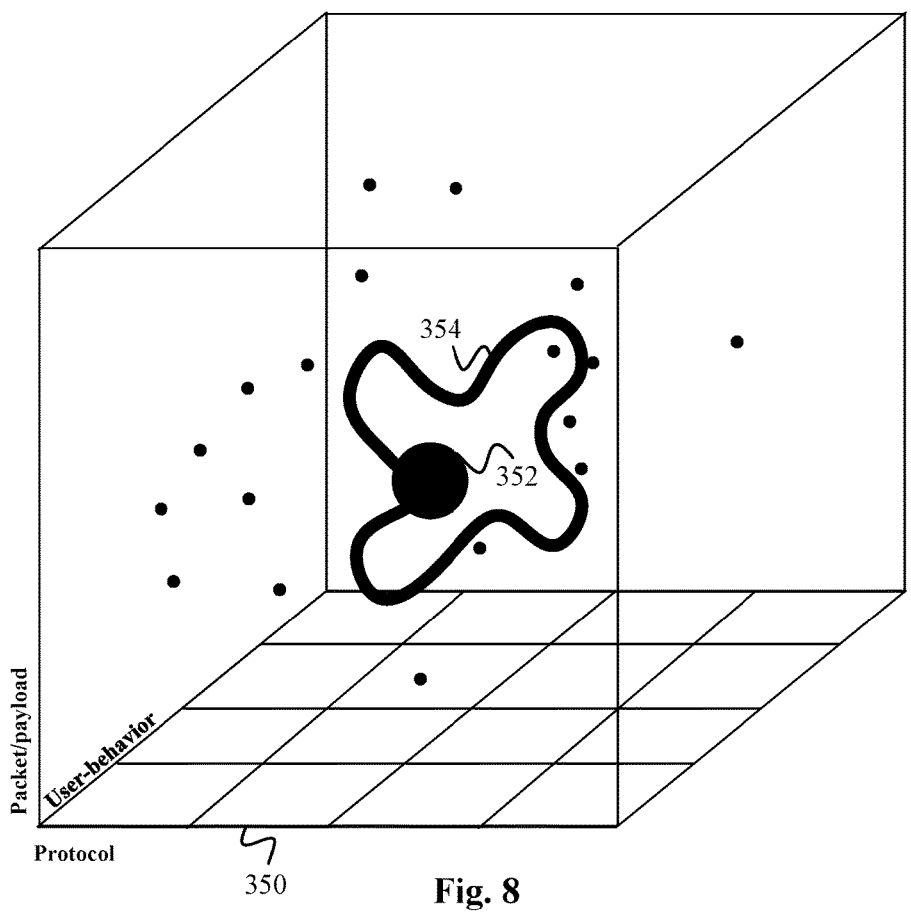
FIG. 8 shows the observed pattern of movement or the drift of the centroid of FIG. 7 as a result of the response of the organization to various events.

Consequently, and referring to FIG. 7, centroid 352 along with its constituent packets represented by individual black dots may exhibit a specific pattern of movement or drift. Such a pattern, if frequent enough may represent "normal" behavior of the system without issuing a false positive. This capability represents an evolving or "rolling" baseline of the present teachings as noted earlier. Furthermore, it may proactively signal the occurrence of such a technical event for users/administrators, who may then proactively prepare a response. The response to a broken down Fab line may be to obtain new wafers for the line and rerun it. One such exemplary pattern 354 of the movement of centroid 352 of FIG. 7 is explicitly visualized in the diagram of FIG. 8. According to the present design, the movement of the centroid may also be shown dynamically on a scatter-graph to facilitate its observation.

In contrast to the above-explained rolling or evolving baseline, a static baseline platform would have issued a number of false positive alerts in response to the above exemplary event. The present design thus avoids issuing these false positives as a result of the "learned" behavior of the system and represents an important contribution over the prior art. Besides semiconductor fabrication, applications of the present teachings are easily conceivable for other verticals. These include automotive and other kinds of manufacturing, high technology, marketing, sales, finance, politics, etc.

In addition to events caused by human acts as likely in the above examples, the rolling baseline of the present design can also be effectively used to monitor the response of the organization to natural disasters or "acts of god". These include flooding, fire, earthquake, or relatedly loss of power at the sites of interest, such as manufacturing lines, shop floors, service centers, etc. As in the earlier embodiments, both supervised and unsupervised machine learning may be used to learn the behavior of the environment and evolve the baseline. Initially, the unsupervised learning using techniques such as k-means clustering of Eq. (1) above may be used to find the location of the centroid. Then human inputs or labels may be provided to adjust the scores of the packets or to assign scores to completely new unknowns, thus forming the supervised component of machine learning.

For packet analysis, fuzzy hashing is employed to determine the fuzzy or context triggered piecewise hashes (CTPH) hashes of the payload which are then stored in the database. Then, as subsequent packets are evaluated, their CTPH hashes are compared to determine the distance or similarity between them using techniques known in the art. In another innovative aspect of the present design, CTPH similarity between packets is used to identify and prevent exfiltration of sensitive data. The CTPH based scoring of the packets provides an effective chain-of-custody or paper-trail of sensitive data of the organization. For a background in fuzzy hashing, the reader is referred to the original paper on the topic by Jesse Kornblum entitled "Identifying Almost Identical Files Using Context Triggered Piecewise Hashing", dated 2006.

Let us explain the fuzzy hashing capability of the present design further while referring back to FIG. 1 and associated explanation. Each packet of data 130 of network 108 is hashed by packet analysis module 118 into piecewise CTPH hashes. These hashes are then stored in database 122. As subsequent packets of data 130 are hashed, their hashes are compared for likeness or similarity along packet-analysis axis of FIG. 7-8. Packets with hashes that are close or similar fall closer together on the packet-analysis axis than others. If certain packets are known to be associated with an anomaly or event, then it is likely that other like packets will also be related to that anomaly/event. Similarly, an entire session that is reconstructed from constituent packets per above teachings is also hashed using CTPH and the hashes are stored in database 122.

Similarly, individual files utilized by the above session are also hashed with the hashes stored in the database. This way, the data surveillance system of the present design can analyze based on the CTPH hashes, if two or more sessions are/were alike, and if two or more files are/were alike. Such an analysis may be determinative of an unintentional data leak or a deliberate exfiltration attempt where a file whose CTPH hash signature appears very close to a sensitive file may have been exported out of the firewall of the organization.

In still another set of advantageous embodiments, the above techniques are used to establish contexts for various events occurring in the organization. While traditional approaches merely provide server logs representing "derived data" to a response team, the present design allows for a more contextual and proactive intervention in the case of a security or another event of interest in the organization.

More specifically, the centroid of the present design represents the baseline population for normal packets traveling in real-time through the network per above teachings. In the case of a security event or a breakdown, the context surrounding the causing anomaly/event is immediately available from the present system. In other words, while referring to FIG. 2 and FIG. 8, the outlier or anomalous packets related to the causing event will be outside of the centroid of the normal population of packets. The context of the event which refers to the relevant details surrounding the event, is then immediately available from data analysis module 112 or 208 of FIG. 1 and FIG. 4 respectively.

Figure 9:
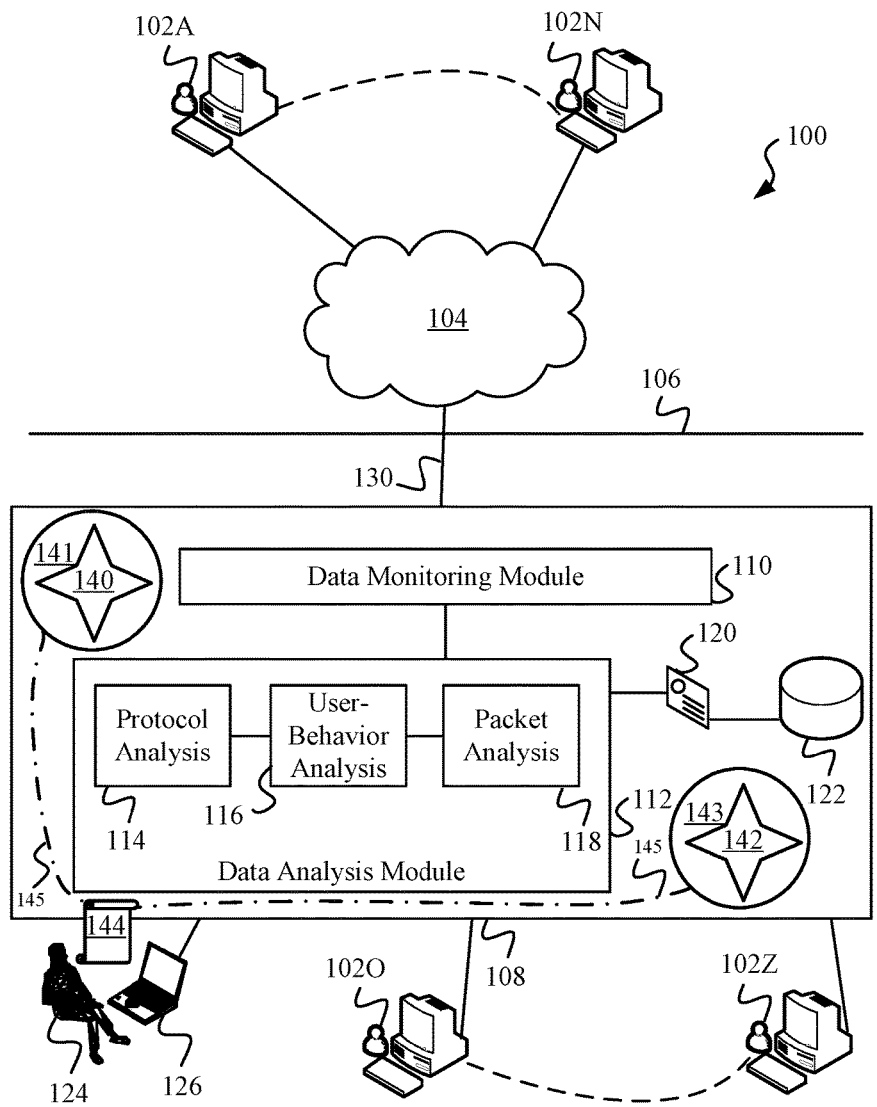
FIG. 9 is a variation of FIG. 1 showing contexts for events established by the present embodiments that allow for more contextual and proactive remedial actions to be taken either in an automated and/or manual fashion.

To understand the present embodiments further, let us take advantage of FIG. 9 which embodies the data surveillance system and methods of the present teachings as previously shown in FIG. 1. However, FIG. 9 also shows events 140 and 142 in their respective contexts 141 and 143. Events 140, 142 may again be man-made events such as security or performance events per above teachings, or they may be breakdowns or other interruptions of normal activity of the organization caused by natural disasters or acts of god.

Preferably, the security event is a data exfiltration attempt or a performance event. The surrounding context 141 of event 140 may contain details such as the username and user's activity or behavior associated with the event, the device associated with the event, the protocol of the networking session and any other details as captured by protocol analysis module 114, user-behavior analysis module 116 and packet analysis module 118 per above teachings. Similarly, context 143 of event 142 may contain all the details offered by the rolling baseline data surveillance techniques of the present design per above teachings.

Subsequently, during the ingestion of derived data or server logs 144 shown in FIG. 9 of the instant data surveillance system, contexts 141, 143 are then attached to the corresponding entries of server logs 144 associated with events 140, 142 respectively. This ingestion/attachment of context is shown by the dotted-and-dashed lines 145 in FIG. 9. For example, event 140 may represent a 500 server-error occurring on a web-server of network 108. This event/error may be due to an intrusion attempt by a hacker, such as by using SQL injection or a null-bit manipulation, resulting in tampering of server logs and/or theft of protected data. Such a security event is identified as an anomaly by the system as lying outside of centroid 182 of FIG. 2 or centroid/pattern 352/354 of FIG. 8 of above teachings. Context 141 is then attached by the system to the respective server log entry or entries associated with the above 500 server-error. Context 141 may comprise a packet trace and a reconstructed session of above teachings associated with the error.

The log entry or entries enhanced by this context information is/are a lot more useful to a response team or admin 124 for investigative and/or corrective actions than just the system/server logs alone of the prevailing art. Based on this context information, they can easily determine if the event is a false positive or a real positive and take remedial actions appropriately.

Logs 144 may belong to any server on the network including any proxy servers. Let us take another example of a security event, such as event 142 of FIG. 9, occurring on network 108. Event 142 is specifically the request of a substantially large or an unusually large file by a user or application. The request may further be for the download of the file by a known user/application with a history of security events, or from a server in a known foreign country with a history of security events. The request may further comprise the distribution of the file to a large number of users. Upon detection of the event by the data surveillance system of the present design, above-discussed context 143 of the event is provided to the proxy server on network 108.

The proxy server (not shown explicitly in FIG. 9) which acts as an intermediary between the user request and the destination server, may then block such a request in a proactive manner. Alternatively, or in addition, it may also alert a response team with the context ingested/attached to the corresponding entries of the server log(s). The response team may then analyze last 30 days of entries in the server logs to find other activities in the organization correlated to the instant context of the event and perform requisite investigation.

Again, such a design allows for an intervention to be taken earlier in the "kill chain" for the event than otherwise possible. Stated differently, the action in response to the event may be taken a number of hops earlier and in a "precog" or preventive manner using the present techniques than the approaches of the prevailing art. Because of the above-discussed automated blocking/prevention of security events before they cause harm to the network and/or proactive remedial actions possible by a response team/administrator 124, the present design thus allows for a "dynamic" management of security policies.

There are a variety of ways in which the advantages of the present embodiments over the prevailing art can be observed. Specifically, in many scenarios the server logs available in the prior art fail to catch a security event of interest whereas the present technology does. For example, a successful SQL injection attack is one in which the attacker is able to take advantage of a null-bit or another loophole to inject and run an extraneous SQL query against a database. The injected SQL may query the database for a large quantity of sensitive data to be exported out of the network. However, for all practical purposes the otherwise nefarious query will appear legitimate to the database and its database or server logs, and as such no alert or warning will be issued by the prior art systems.

In contrast, the instant rolling baseline technology will detect the event as an unusual activity/event, exemplarily event 142 of FIG. 9. This is because data analysis module 108 will detect that there is an unusually large amount of data/files being sent by the system, or by a user, device or application, compared to their own past histories or compared to other like users, devices or systems per above teachings. As a result, the instant design can issue an alert or warning along with context 143 of event 142. As taught above, the present system and its methods then attach/correlate context 143 to the corresponding server log entries. Based on this context, an investigation may be carried out by a response team, or the event may be automatically and proactively stopped per above discussion.

In another distinguishing example of the present design, a mismatch between the amount of data being sent/received by a server or host and the amount being reported in its logs can be detected by the present technology. However, such an event or situation can be completely transparent or "under the radar" of the technologies of the prevailing art. More specifically, since the amount of data being sent/received by a server is known to the instant system, it is possible to compare it against what is being logged by the server. If the logs underreport the amount of data, then this may indicate a security compromise whereby an attacker has manipulated/suppressed the logs to conceal his/her intent of data theft.

Alternatively, this may happen due to a misconfiguration of the server. In either case, it is vital to detect and correct such a situation as possible using the present techniques. Again, the present rolling baseline design can detect such an event and associate it with the right context. This is because protocol analysis module 114, user-behavior analysis module 116 and packet analysis module 118 of FIG. 9 can score the data packets to/from the server/host in question per above teachings, against those of other like servers/hosts and/or against historical scores of the packets of the server itself. The above-described scenario will result in the packets being outside of the normal population or centroid 352 with its pattern 354 of FIG. 8. Therefore, in the context established for the above event which may be then attached or correlated to appropriate server log entries per above teachings, an alert may be raised and an appropriate remedial action may be taken. Rest of the relevant teachings of the prior embodiments apply to the present embodiments also.

As already noted in reference to FIG. 4, the computers and devices of the network being surveilled may oftentimes be a distributed system. Such a distributed system may conform to a specific distributed system stack/architecture having nodes with designated functions, such as in Apache Hadoop, or not. Thus, in yet another set of highly preferred embodiments, the previously taught embodiments are "agent-ized" and deployed in a distributed fashion on the nodes/devices of a distributed network.

One or more devices/computers of such a distributed design is turned into a security appliance by deploying on it an agent layer or software. The agent software on the distributed device performs some key functions. It makes the device act as a network tap by copying/mirroring every data packet sent to/from the device, to a dedicated master device/server/machine. For this purpose, a master device is first chosen from amongst the distributed devices/computers. The choosing of the master device or master security appliance may be done using an appropriate leader election protocol available in the art. Such an election protocol may be quorum based, such as that used by Apache Zookeeper. Otherwise, an appropriate leader election algorithm including the bully algorithm, Chang and Roberts' ring algorithm, Hirschberg-Sinclair ring algorithm, etc. may be employed.

The master device receives the packets from all the agents in the network. It then develops a rolling baseline by performing dynamic analysis of the data packets per prior teachings. Specifically, it analyzes the protocol, user-behavior and network properties of the packets using a data analysis module. The data analysis module may again further comprise of a protocol analysis module, a user-behavior analysis module and a network analysis module of the prior teachings. The reader is referred to at least FIG. 1 and FIG. 4 and related explanation for a refresher on the capabilities of these modules, and other related teachings for the development/establishment of the evolving/rolling baseline of the present design.

Once the master has established the baseline, it then communicates the baseline to all the distributed agents. For ongoing updates to the baseline, it merely sends them the incremental updates to the baseline in order to economize on network traffic. Thus, the master is responsible for establishing the rolling baseline based on the packets received from all the agents, and then to keep the agents updated of the latest baseline.

Once the agents have received the updated baseline, they then score the network packets against the baseline and issue any alerts or notifications as needed. The reader is referred to Eq. (1) above and related teachings for the scoring or distance calculation of the packets against the baseline. More specifically, each agent scores the network packets sent/received by the device against the centroid of the latest baseline received from the master. If the distance of a packet from the centroid is large enough, or differently stated, an anomaly is detected by the agent based on the score/distance of the packet, an appropriate alert is generated by the agent per prior teachings.

Therefore, the design of the present embodiments breaks up the functionality of the surveillance system of the prior embodiments into a master component, running on a master device, and an agent component running on one or more other (non-master) or agent devices of the host distributed network. The master component, or simply the master, is responsible for establishing the baseline based on the packets seen by all other distributed devices. It is also responsible for keeping the distributed agents updated of the latest baseline.

On the other hand, all the distributed agents are responsible for scoring each packet of data seen or sent/received by their respective devices/machines against the baseline received from the master. For this purpose, they mirror/copy each packet of data sent/received by the device to the master, in a similar manner as switch 206 discussed earlier in reference to the embodiment of FIG. 4. The design of the present embodiments is thus referred to as "community capture". That is because it allows some subset or all devices, or the "community" of devices of a distributed network to participate in the identification/detection of security and/or performance anomalies of the network.

As in the prior embodiments, the devices on the network may be any type of computing devices, including servers, desktops, laptops, tablets, mobile/smart phones, etc. Thus, the agents of the present embodiments are specifically designed/developed and deployed according to the architectures and operating systems of the target devices. For example, the agents for a Microsoft server and an iOS device (such as an iPhone), will be developed and deployed according to the prevailing norms for software development and deployment for these target platforms.

Figure 10:
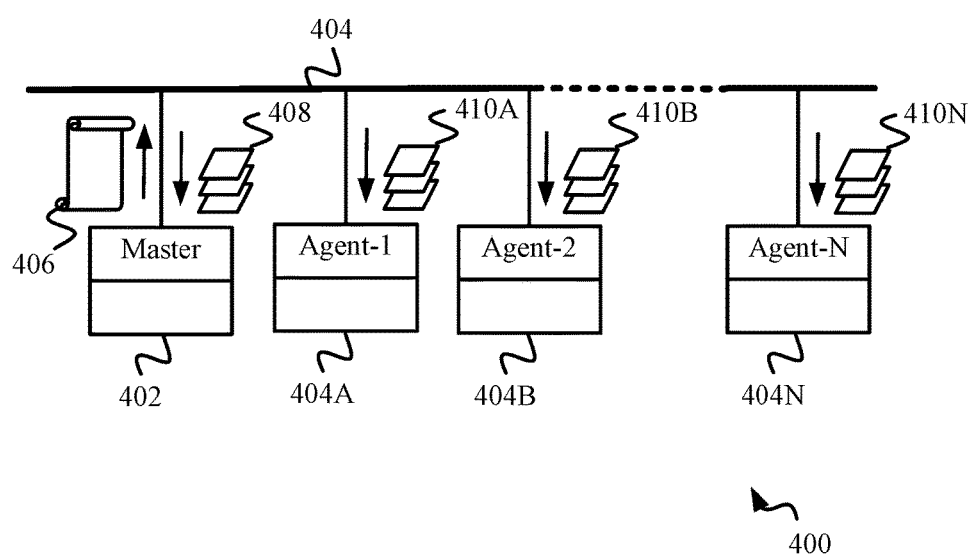
FIG. 10 is an embodiment of the present data surveillance techniques in a distributed network having a bus topology or architecture.

The distributed architecture design for the present embodiments may have a bus architecture/topology or a hub-and-spoke topology. FIG. 10 visualizes such a bus architecture 400, containing a number of distributed security appliances in a master/agent configuration of the present teachings. More specifically, the diagram shows distributed devices 404A, 404B, . . . , 404N of the present embodiments with their respective software agents/layers Agent-1, Agent-2, . . . , Agent-N running on them.

The figure also shows a master component/software running on master device 402 and transmitting/communicating rolling baseline 406 along with its centroid of normal population of the above teachings to devices 404A, 404B, . . . , 404N and more specifically to respective agents Agent-1, Agent-2, . . . , Agent-N running on these devices. The above communication happens via bus 404 to which all the devices of the distributed network shown are connected. In one embodiment, bus 404 may deploy a Hadoop distributed file system (HDFS). FIG. 10 also shows data packets 410A-N sent by respective devices 404A-N via bus 404 to master device 402 where they are all received as data packets 408. Based on packets 408, master 402 establishes and communicates baseline 406 to the agents per above teachings.

Figure 11:
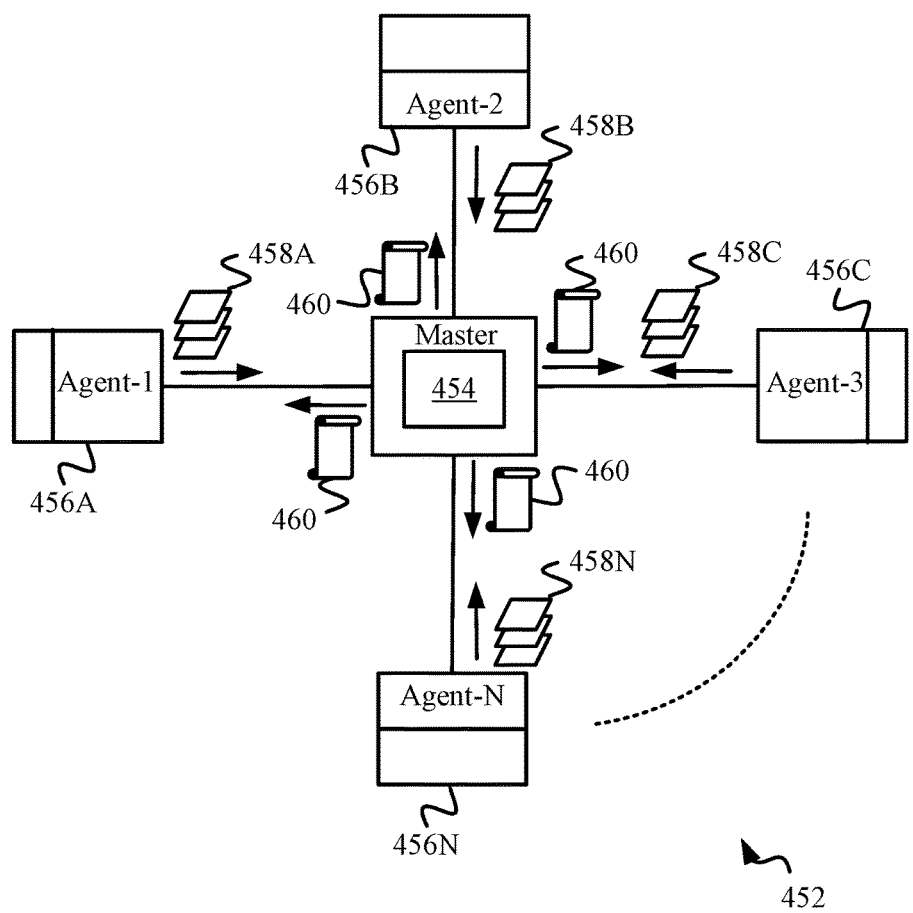
FIG. 11 is an embodiment of the present data surveillance techniques in a distributed network having a hub-and-spoke topology or architecture.

FIG. 11 shows a hub-and-spoke topology 452 of the present embodiments. In the embodiment shown in FIG. 11, device 454 or the hub has master component/software running on it, and devices 456A, 456B, 456C, . . . , 456N have respective agent software Agent-1, Agent-2, Agent-3, . . . , Agent-N running on them as shown. The agent devices are connected to the master in a hub-and-spoke model as shown. The agents on devices 456A-N mirror/copy data respective packets 458A-N to master 454, which then develops and communicates/updates rolling baseline 460 with its centroid to the agents. The agents then score each data packets seen by them against baseline 460 and issue appropriate alerts/notifications per above teachings.

Note that the entire software system of the prior embodiments may be deployed as both the master and agent layers or components of the present embodiments shown in FIG. 10-11. However, as per the design of the present embodiments, portions of the software system are selectively invoked. Specifically, the master receives all incoming packets from the agents and builds/establishes the rolling baseline, while the agents score their packets against the baseline received from the master. Of course, the additional capability required for the present embodiments is for the master to communicate/update the baseline to the agents, and for the agents to mirror/copy their data packets to the master per above explanation.

It is also to be noted that the present embodiments may be practiced by deploying its agents on any pre-existing agents on the distributed network. For example, if the host distributed network already has other security agents running on its devices, then the master/agent components of the present design may be supplied as libraries bundled with the pre-existing agents. The already existing agents would then simply instantiate the code in these libraries to launch the master and agent functionalities of the above teachings on the distributed devices of the distributed network.

Distributed Failover

In the present embodiments, if the master device fails or becomes disconnected, another server is set up from amongst the remaining connected devices. In a bus architecture such as that shown in FIG. 10, this is preferably accomplished by a quorum-based leader election by the remaining agent devices. This may be accomplished using Apache Zookeeper or an alternative leader election protocol as noted above. Preferably, the device with the most available compute resources is chosen to be the leader/master. Alternatively, a backup/standby master device becomes the new master also termed herein as the replacement master, once original master 402 fails. The standby master may be a "hot" standby which has an up-to-date version of rolling baseline 406. The standby device may also be a "cold" standby that first develops baseline 406 based on data packets 410A-N received by it after becoming the master.

In a hub-and-spoke design, such as that shown in FIG. 11, a standby or backup master may be predesignated that becomes the master once the hub or master 454 fails. The standby device may again be a hot or cold standby. A chain of successive masters may also be predesignated. Once the new or replacing/replacement master is set up in the network, and the old master also rejoins, the old master becomes another agent, or another standby, based on the design/configuration options selected.

In one implementation, when a replacement master is elected upon a failure/failover of the original master, such as master 402 of FIG. 10 or master 454 of FIG. 11, the quorum-based election protocol tries to fulfill the "adequacy" or resources requirements of the original master. The adequacy requirements are the minimum requirements in terms of processing power, storage, network bandwidth or data capture requirements or any other resources that are needed to match the capabilities of the original master. The election protocol chooses the node among a chain of pre-designated nodes that is the least loaded, as replacement/new master. If the replacement master is inadequate, it adds another node to what is now a master cluster of two new nodes acting as a single master in a distributed computing fashion. If the two nodes are still inadequate, another node is added and so.

The master cluster of nodes utilizes distributed computing models known in the art to satisfy any or all of the above-mentioned adequacy requirements established based on the original master. Thus, the master cluster establishes and maintains the rolling baseline of the above teachings that it communicates and updates to the rest of the agents in the network. The agents then score each data packet against this baseline as well as communicate their data packets to the master cluster per above teachings. In an extreme scenario, all the nodes of the entire network may be jointed to the master cluster thus resulting in a fully-distributed computing environment.

All other relevant teachings of the prior embodiments, including utilizing patterns of centroid drift and contextual information of events, apply to the present embodiments also.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method of surveillance of a first plurality of packets of data in a distributed computer network of an organization, said method executing computer program instructions stored in a non-transitory storage medium and comprising the steps of:
   (a) analyzing a protocol of said data;
   (b) analyzing a user-behavior of a user of said distributed computer network;
   (c) analyzing a content of each packet belonging to said first plurality of packets of said data by utilizing deep packet inspection (DPI);
   (d) establishing a baseline of said data by assigning said each packet to a cluster of said packets amongst a first plurality of clusters of said packets of said data;
   (e) computing an overall score of said each packet along axes comprising said protocol, said user-behavior and said content;
   (f) based on said overall score, computing an absolute distance between said each packet and a center of said cluster of said packets of said data;
   (g) performing said assigning by minimizing an objective function given by a value computed by squaring said absolute distance and summing said value across said first plurality of said packets of said data and further summing said value across said first plurality of said clusters of said packets of said data; and
   (h) performing steps (a) through (g) in a master device of said distributed computer network and communicating said baseline to an agent device of said distributed computer network.

2. The method of claim 1, further scoring in said agent device, each packet belonging to a second plurality of packets seen by said agent device, based on a distance of said each packet belonging to said second plurality of packets, from a centroid of said baseline.

3. The method of claim 2 further analyzing in said agent device the entirety of a session of said user.

4. The method of claim 2 detecting an anomaly in said data.

5. The method of claim 4 having said anomaly related to a security issue of said distributed computer network.

6. The method of claim 5, selecting said security issue from the group consisting of a data exfiltration attack, a data intrusion attack, a data loss attempt, a data leak attempt and a data steganography attack.

7. The method of claim 4 having said anomaly related to a performance issue of said distributed computer network.

8. The method of claim 1 electing a standby device to serve as a replacement master in the event of a failure of said master device.

9. The method of claim 8 distributing said replacement master over a master cluster of nodes, if said replacement master does not fulfill adequacy requirements established based on capabilities of said master device in step (h).

10. The method of claim 1 further comparing in said step (c), a payload in said content against a standard of a file that said packet is purported to belong to.

11. The method of claim 1 applying fuzzy hashing to a payload of said content for obtaining its context triggered piecewise hashes (CTPH).

12. The method of claim 1 further analyzing a drift of a centroid of said baseline in accordance with activities of said organization.

13. A system for surveilling a plurality of packets of data in a distributed computer network of an organization, said system comprising a first set of computer-readable instructions stored in a first non-transitory storage medium and a first microprocessor coupled to said first storage medium for executing said first set of computer-readable instructions, said first microprocessor configured to:
 (a) analyze a protocol of said data;
 (b) analyze a user-behavior of a user of said distributed computer network;
 (c) analyze a content of each packet belonging to said plurality of packets of said data by performing deep packet inspection (DPI);
 (d) establish a baseline of said data by an assignment of said each packet to a cluster of said packets amongst a plurality of clusters of said packets of said data;
 (f) compute an overall score of said each packet along axes comprising said protocol, said user-behavior and said content;
 (g) based on said overall score, compute an absolute distance between said each packet and a center of said cluster of said packets of said data; and
 (e) perform said assignment by a minimization of an objective function given by a value computed as a square of said absolute distance summed across said plurality of said packets of said data and further summed across said plurality of said clusters of said packets of said data;
 wherein said first microprocessor belongs to a master device of said distributed computer network.

14. The system of claim 13, wherein said system further comprises a second set of computer-readable instructions stored in a second non-transitory storage medium and a second microprocessor coupled to said second storage medium for executing said second set of computer-readable instructions, said second microprocessor belonging to an agent device of said distributed computer network, and said second microprocessor configured to score each packet amongst a set of packets received by said agent device, based on a distance of said each packet amongst said set of packets, from a centroid of said baseline.

15. The system of claim 14 wherein said second microprocessor is further configured to establish a context of a security event in said organization.

16. The system of claim 15 wherein said context is attached to one or more entries of a server log file.

17. The system of claim 16 wherein said server log file belongs to a proxy server on said distributed computer network.

18. The system of claim 14 wherein said microprocessor is further configured to analyze a drift of said centroid in accordance with activities of said organization.

19. The system of claim 18 wherein a pattern of said drift is recorded and correlated to an activity amongst said activities.

20. The system of claim 18 wherein said activities include a response of said organization to one or both of a natural disaster and a technological breakdown.

21. The system of claim 14 wherein said second microprocessor detects a performance issue related to said distributed computer network.

* * * * *